(12) United States Patent
Yoshida

(10) Patent No.: US 10,712,887 B2
(45) Date of Patent: Jul. 14, 2020

(54) DISPLAY DEVICE

(71) Applicant: Sharp Kabushiki Kaisha, Sakai, Osaka (JP)

(72) Inventor: Masahiro Yoshida, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 42 days.

(21) Appl. No.: 16/171,400

(22) Filed: Oct. 26, 2018

(65) Prior Publication Data
US 2019/0129537 A1   May 2, 2019

(30) Foreign Application Priority Data

Nov. 2, 2017  (JP) .................................. 2017-212841

(51) Int. Cl.
*G06F 3/044*  (2006.01)
*G06F 3/041*  (2006.01)

(52) U.S. Cl.
CPC ............ *G06F 3/044* (2013.01); *G06F 3/0412* (2013.01); *G06F 3/04164* (2019.05)

(58) Field of Classification Search
CPC ..... G06F 3/044; G06F 3/0412; G06F 3/04164
See application file for complete search history.

(56) References Cited

U.S. PATENT DOCUMENTS

| | | | |
|---|---|---|---|
| 9,024,913 B1 | 5/2015 | Jung et al. | |
| 2009/0102824 A1* | 4/2009 | Tanaka | G09G 3/3648 345/205 |
| 2016/0247478 A1* | 8/2016 | Ishige | G09G 3/3677 |
| 2016/0255732 A1* | 9/2016 | Lee | G04B 39/02 361/679.01 |
| 2017/0061933 A1* | 3/2017 | Jang | G09G 3/2085 |
| 2017/0309644 A1* | 10/2017 | Yeh | G02F 1/1362 |
| 2018/0011601 A1* | 1/2018 | Kurasawa | G06F 3/0412 |
| 2018/0107330 A1* | 4/2018 | Meng | G06F 3/0416 |
| 2019/0036073 A1* | 1/2019 | Yu | H01L 51/5281 |

FOREIGN PATENT DOCUMENTS

JP       2015-210811 A    11/2015

* cited by examiner

*Primary Examiner* — Ibrahim A Khan
(74) *Attorney, Agent, or Firm* — Keating & Bennett, LLP

(57) ABSTRACT

A display device includes a signal supply part, a substrate including a display region and a second region having a width increase section, a display line on the display region and through which a signal for display is transmitted, a line on the first region and through which a signal is transmitted, a signal receive part on the second region, a display lead line connected to the signal supply part and an end of the display line close to the signal supply part, a first lead line connected to the signal supply part and an end of the line close to the signal supply part, and a second lead line connected to the signal receive part and another end of the line opposite from the end of the line close to the signal supply part.

14 Claims, 15 Drawing Sheets

DISPLAY DEVICE

CROSS REFERENCE TO RELATED APPLICATION

This application claims priority from Japanese Patent Application No. 2017-212841 filed on Nov. 2, 2017. The entire contents of the priority application are incorporated herein by reference.

TECHNICAL FIELD

The technology described herein relates to a display device.

BACKGROUND

Japanese Unexamined Patent Application Publication No. 2015-210811 discloses an example of a known display device including a display panel having an in-cell touch panel function. The display panel disclosed in Japanese Unexamined Patent Application Publication No. 2015-210811 includes signal lines connected to pixels, and sensor lines connected to touch sensors. The display panel also includes a first feeding unit that supplies a common voltage to the first end of each sensor line during a display driving period and supplies a touch driving signal to the first end of each sensor line during a touch sensor driving period. The display panel also includes a second feeding unit that connects the sensor lines to short-circuit the touch sensors and supplies the common voltage to the second end of each sensor line during the display driving period. The second feeding unit isolates the sensor lines during the touch sensor driving period.

The display device disclosed in Japanese Unexamined Patent Application Publication No. 2015-210811 makes uniform the common voltage applied to the pixels, and therefore produces an effect of improving touch sensitivity and touch recognition accuracy. The display panel disclosed in Japanese Unexamined Patent Application Publication No. 2015-210811 has a display region of which the plane shape is a rectangular shape. In addition, there are display panels having a display region of which the plane shape is a shape other than the rectangular shape. For example, there is a display panel including a wide portion having a width increasing as being distanced from a driver serving as a signal supply source. In such a display panel, there is a tendency to increase a creepage distance of lead lines for connecting sensor lines to the driver near the wide portion. Moreover, lead lines for connecting data lines to the driver are disposed between the driver and the wide portion, in addition to the lead lines connected to the sensor lines, resulting in higher wiring density. Owing to this arrangement, a line width between the lead lines connected to the sensor lines is apt to become narrow, which may cause occurrence of a disconnection.

SUMMARY

The technology described herein was made in view of the above circumstances. An object is to suppress occurrence of disconnection.

A display device according to the technology described herein includes a signal supply part configured to supply a signal, a substrate including a first region and a second region that is on an edge of the first region and includes a width increase section having a width increasing as is farther away from the signal supply part, the substrate further including a display region covering the first region and the second region and displaying an image, a display line disposed on the display region and through which a signal for display is transmitted, a line disposed on the first region and through which a signal is transmitted, a signal receive part disposed on the second region, a display lead line connected to the signal supply part and an end of the display line close to the signal supply part, a first lead line connected to the signal supply part and an end of the line close to the signal supply part, and a second lead line connected to the signal receive part and another end of the line opposite from the end of the line close to the signal supply part.

With this configuration, an image is displayed on the display region, based on a signal for display, the signal being transmitted through the display line. The second region on the substrate is located on the end of the first region, and includes the width increase section. Therefore, a distance from the signal supply part to the signal receive part on the second region tends to be longer than a distance from the signal supply part to a signal receive part to be disposed on the first region. For this reason, in a case of providing lead lines for directly connecting the signal receive parts to the signal supply part, the creepage distance of the lead lines may become excessively long. Moreover, the display lead line connected to the display line on the second region is disposed on the region from the signal supply part to the signal receive part on the second region. Therefore, in the case of providing the lead lines for directly connecting the signal receive parts to the signal supply part, the wiring density becomes excessively high, so that the line width between the lead lines is apt to become narrow. As described above, the lead lines for directly connecting the signal receive parts to the signal supply part tend to cause an excessively long creepage distance and an excessively narrow line width, which may result in occurrence of a disconnection.

In contrast to this, the signal receive part on the second region receives signals through the line on the first region, the first lead line connected to the end, closer to the signal supply part, of the line, and the second lead line connected to the end, opposite to the end closer to the signal supply part, of the line. Therefore, this configuration eliminates necessity of the lead lines for directly connecting the signal receive parts to the signal supply part. The second lead line is not disposed on the region from the signal supply part to the second region, so that at least the wiring density at this region is restrained to be low. This configuration thus secures a satisfactory wide line width between the second lead lines and therefore suppresses occurrence of a disconnection.

The technology described herein enables suppression of occurrence of a disconnection.

DETAILED DESCRIPTION

First Embodiment

With reference to FIGS. 1 to 7, a first embodiment of the technology described herein will be described. The first embodiment exemplifies a liquid crystal display device (a display device) 10 having a touch panel function (a position input function). It should be noted that some of the drawings illustrate an X axis, a Y axis, and a Z axis, and the axes in each drawing correspond to the respective axes in other drawings. It should also be noted that in FIG. 4, the upper side is defined as a front side, and the lower side is defined as a back side.

Figure 1:
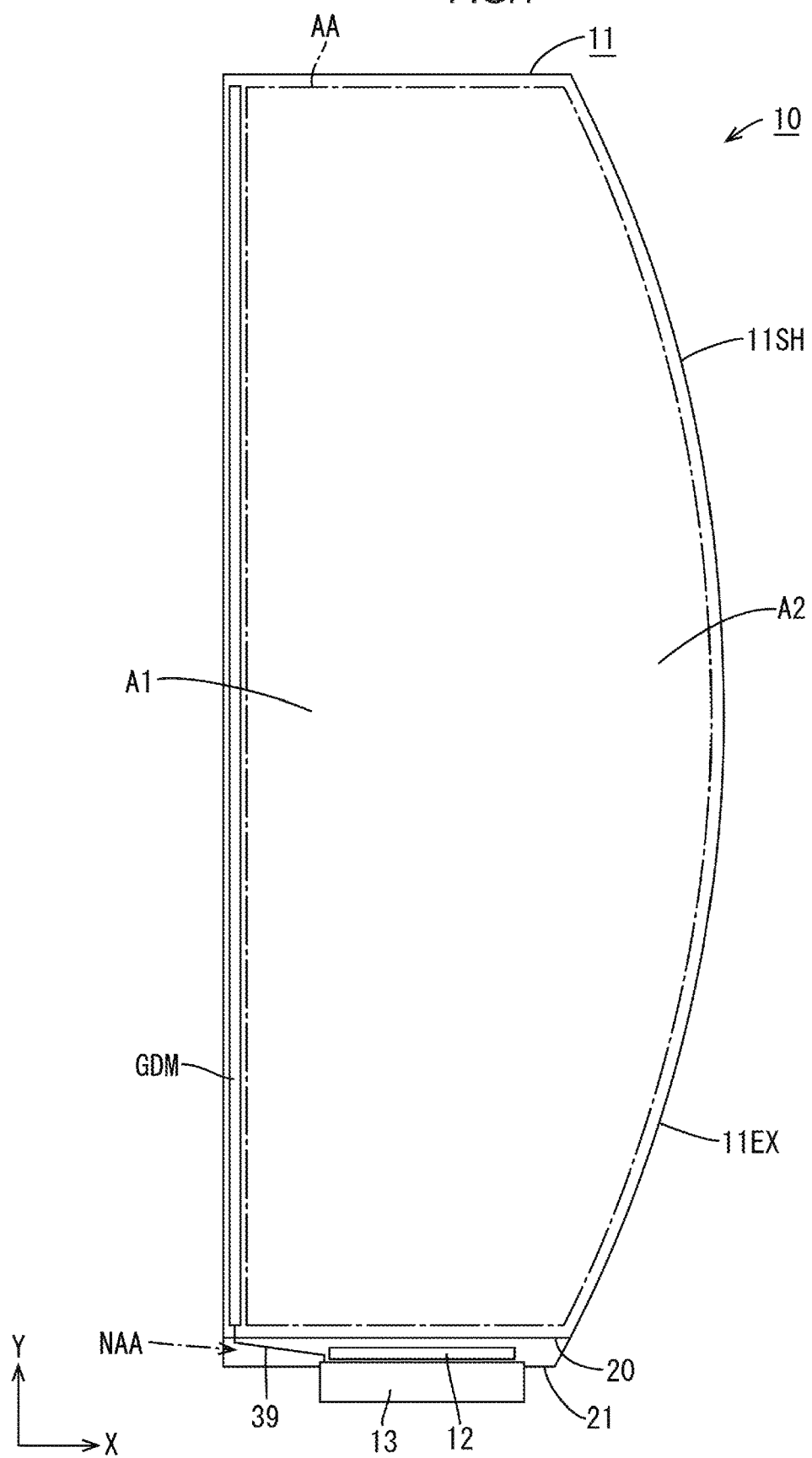
FIG. 1 is a plan view of a liquid crystal panel in a liquid crystal display device according to a first embodiment of the technology described herein.

As illustrated in FIG. 1, the liquid crystal display device 10 includes at least a liquid crystal panel (a display panel) 11 displaying an image, and a backlight unit (a lighting unit) serving as an external light source configured to emit light for use in display to the liquid crystal panel 11. In the first embodiment, the liquid crystal panel 11 has, for example, an about 12-inch (specifically, 12.4-inch) screen with 1920× 720 resolution. The backlight unit is disposed on a back side (a rear surface side) of the liquid crystal panel 11. The backlight unit includes, for example, a light source (e.g., a light emitting diode (LED)) configured to emit white light, and an optical member configured to subject light from the light source to optical action, thereby converting the light into planar light. It should be noted that the backlight unit is not illustrated in the drawings.

As illustrated in FIG. 1, the liquid crystal panel 11 has an outline that is not formed in a typical quadrangular shape, but is formed in an odd shape (a shape other than a rectangular shape) such that the outline partially includes a curved portion like a segment of a circle, as seen in a plan view. The liquid crystal panel 11 is formed in a vertically elongated shape as a whole. The liquid crystal panel 11 includes a width increase section 11EX having a width that is increased as being distanced from a driver 12 to be described later. The liquid crystal panel 11 also includes a width decrease section 11SH having a width that is decreased as being distanced from the driver 12. More specifically, the liquid crystal panel 11 includes a first region A1 and a second region A2. The first region A1 occupies the most of the liquid crystal panel 11 excluding a right end portion of the liquid crystal panel 11 in FIG. 1, and has a vertically elongated quadrangular shape as seen in a plan view. The second region A2 occupies the right end portion of the liquid crystal panel 11 in FIG. 1, and has an arcuate shape as seen in a plan view. The first region A1 is defined by straight lines that are parallel to the X-axis direction or the Y-axis direction. In other words, the first region A1 does not include the width increase section 11EX and the width decrease section 11SH. The second region A2 is located on an end of the first region A1 in the X-axis direction. The second region A2 includes the width increase section 11EX and the width decrease section 11SH each of which partially has an arched (curved) outline in a plan view. The second region A2 has an elongated shape and the second region A2 includes a lower portion (a portion closer to the driver 12) in the Y-axis direction illustrated in FIG. 1 as the width increase section 11EX and an upper portion (a portion farther from the driver 12) in the Y-axis direction illustrated in FIG. 1 as the width decrease section 11SH.

As illustrated in FIG. 1, the screen of the liquid crystal panel 11 has a display region AA (a range enclosed with an alternate long and short dash line in FIG. 1) where an image is displayed. The display region AA is located at a central portion of the screen. The screen of the liquid crystal panel 11 also has a non-display region NAA where an image is not displayed. The non-display region NAA is located at an outer peripheral portion of the screen, and is defined in a frame shape such that the display region AA is surrounded with the non-display region NAA. In the liquid crystal panel 11, the display region AA is located over the first region A1 and the second region A2. The display region AA is defined in an odd shape that is analogous to the shape of the outline of the liquid crystal panel 11 as seen in plan view. In the liquid crystal panel 11, the non-display region NAA is also located over the first region A1 and the second region A2. The liquid crystal panel 11 includes a pair of substrates 20 and 21 bonded together. The substrate 20 is a color filter (CF) substrate (a counter substrate) 20 serving as the front side (the front surface side) of the liquid crystal panel 11. The substrate 21 is an array substrate (a substrate, an active matrix substrate) 21 serving as the back side (the rear surface side) of the liquid crystal panel 11. Each of the CF substrate 20 and the array substrate 21 is formed of a glass substrate, and a stack of various films is disposed on an inner face side of the glass substrate. Each of the CF substrate 20 and the array substrate 21 has the first region A1 and the second region A2. Although not illustrated in the drawings, a polarizing plate is affixed to an outer face side of each of the CF substrate 20 and the array substrate 21.

As illustrated in FIG. 1, the CF substrate 20 is shorter in longer-edge dimension than the array substrate 21, and is bonded to the array substrate 21 such that the CF substrate 20 and the array substrate 21 are aligned with each other at their first ends in the longer-edge direction (the Y-axis direction). Therefore, a second end of the array substrate 21 in the longer-edge direction protrudes sideward from the CF substrate 20. A driver (a signal supply part) 12 and a flexible printed circuit board 13 are mounted on this protruding portion of the array substrate 21 (the shorter-edge portion on the non-display region NAA). The driver 12 is configured to supply various signals for a display function and a touch panel function to be described later. The driver 12 includes a large-scale integration (LSI) chip having a drive circuit incorporated therein. The driver 12 is mounted on the array substrate 21 by chip-on-glass (COG) bonding, and is configured to process various signals to be transmitted by the flexible printed circuit board 13. In the first embodiment, the driver 12 is formed in an elongated block shape extending in the X-axis direction. Also in the first embodiment, one driver 12 is mounted at an almost central position of the array substrate 21 in the shorter-edge direction (the X-axis direction). The flexible printed circuit board 13 includes a base member made of an insulating and flexible synthetic resin (e.g., a polyimide resin), and a large number of wiring patterns (not illustrated) formed on the base member. The flexible printed circuit board 13 has a first end connected to the liquid crystal panel 11 in the non-display region NAA, and a second end connected to a control circuit board (a signal supply source) (not illustrated). The control circuit board supplies various signals to the liquid crystal panel 11 via the flexible printed circuit board 13. These various signals are subjected to processing by the driver 12 in the non-display region NAA, and then are output to the display region AA. A gate circuit part (a display circuit part) GDM is disposed on the longer-edge portion of the array substrate 21 in the non-display region NAA. The longer-edge portion adjoins to the region where the driver 12 and the flexible printed circuit board 13 are mounted. The gate circuit part GDM is provided in a monolithic manner using the various films of the array substrate 21, and is configured to supply a scanning signal (a signal) to a gate line 26 to be described later. A gate circuit connection line 39 is disposed on the array substrate 21 in the non-display region NAA to relay and connect the gate circuit part GDM and the flexible printed circuit board 13. The gate circuit connection line 39 includes, for example, a clock line for transmitting a clock signal, a low-potential line for transmitting a low-potential signal, and a start signal line for transmitting a start signal.

Figure 2:
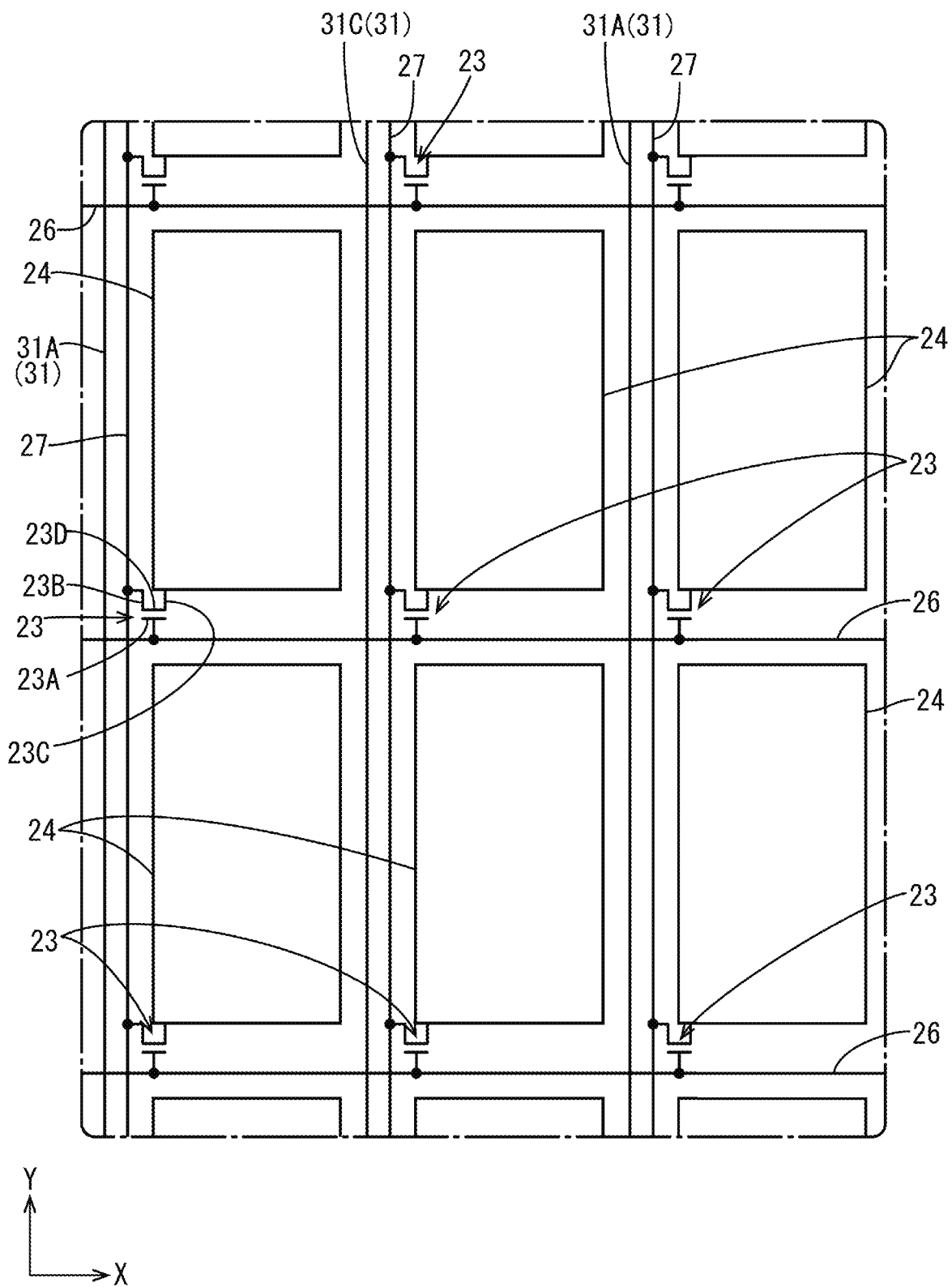
FIG. 2 is a plan view of a pixel arrangement on an array substrate constituting the liquid crystal panel.

As illustrated in FIG. 2, at least thin-film transistors (TFTs) (switching elements) 23 and pixel electrodes 24 are disposed on the inner face side of the array substrate 21 of the liquid crystal panel 11 in the display region AA. A large number of TFTs 23 and a large number of pixel electrodes are arranged in a matrix form (in the row and column directions) so as to be spaced apart from one another in the X-axis direction and the Y-axis direction. Gate lines (second display lines, scanning lines) 26 and source lines (display lines, signal lines) 27 are disposed around the TFTs 23 and the pixel electrodes 24. The gate lines 26 and the source lines 27 are perpendicular to each other, that is, intersect with each other. The gate lines 26 extend in the X-axis direction, and the source lines 27 extend in the Y-axis direction. The number of gate lines 26 is, for example, 1920, and the number of source lines 27 is, for example, 2160. Each of the TFTs 23 includes a gate electrode 23A connected to the corresponding gate line 26, a source electrode 23B connected to the corresponding source line 27, a drain electrode 23C connected to the corresponding pixel electrode 24, and a channel portion 23D connected to the source electrode 23B and the drain electrode 23C. Each of the TFTs 23 is driven based on a scanning signal supplied to the corresponding gate line 26. Thus, an electric potential related to an image signal to be supplied to the source line 27 is supplied to the drain electrode 23C via the channel portion 23D, so that the pixel electrode 24 is electrically charged at the electric potential related to the image signal. Each of the pixel electrodes 24 has a plane shape that is a vertically elongated and substantially quadrangular shape. In addition, each of the pixel electrodes 24 has a shorter edge extending along the gate lines 26, and a longer edge extending along the source lines 27. Touch lines (position detection lines) 31 to be described in detail later are also disposed on the array substrate 21 in the display region AA. In the first embodiment, the touch lines 31 extend along the source lines 27. In the X-axis direction, each of the touch lines 31 is interposed between the corresponding source line 27 and the corresponding pixel electrode 24 to which the source line 27 is not connected. The number of touch lines 31 is equal to or smaller than the number of source lines 27.

Figure 3:
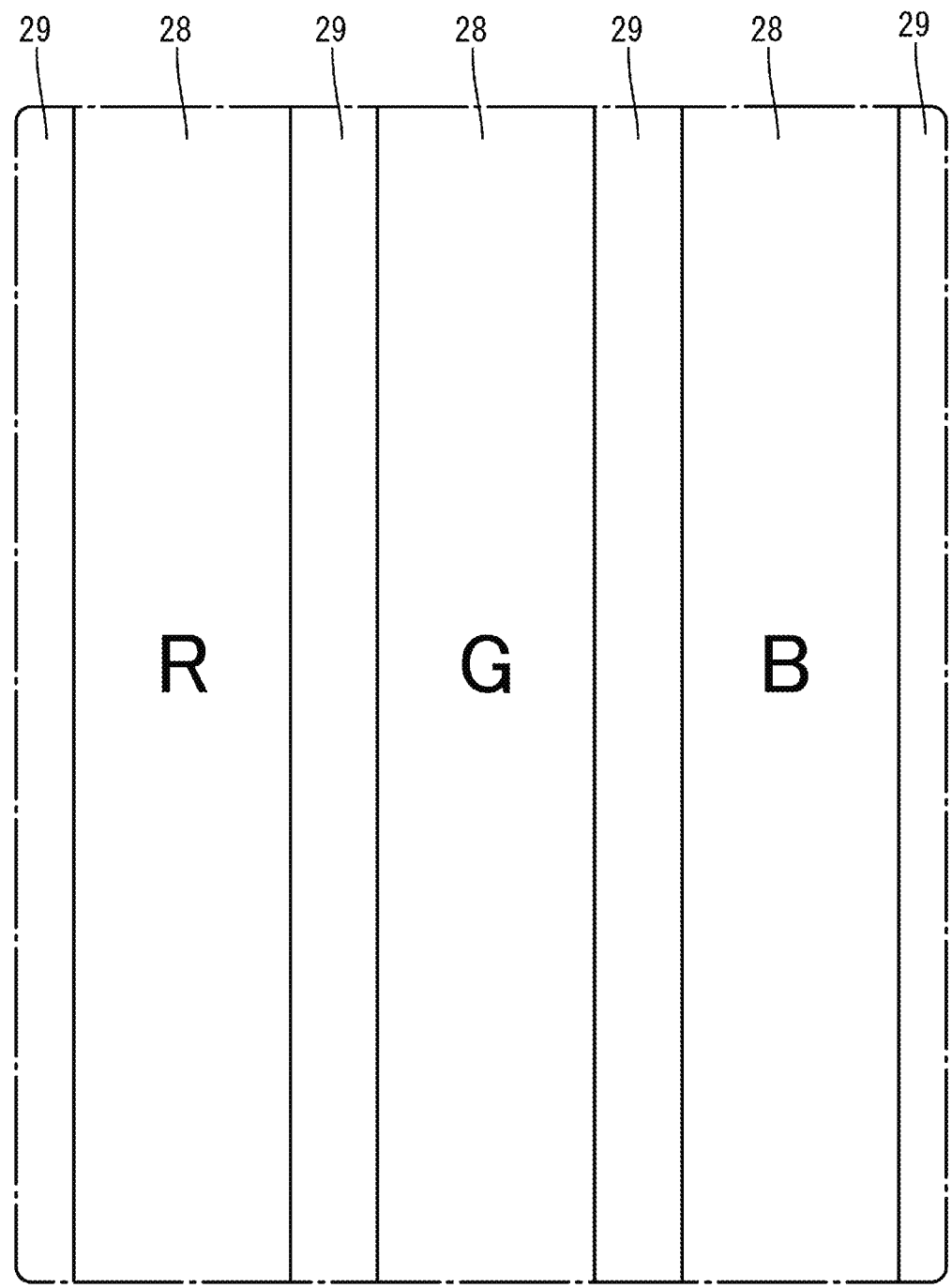
FIG. 3 is a plan view of a pixel arrangement on a CF substrate constituting the liquid crystal panel.

As illustrated in FIG. 3, at least color filters 28 and light shielding portions (black matrixes) 29 are disposed on the inner face side of the CF substrate 20 in the display region AA. The color filters 28 provide three colors of blue (B), green (G), and red (R). A large number of color filters 28 providing different colors are repeatedly arranged along the gate lines 26 (in the X-axis direction) so as to extend along the source lines 27 (in the Y-axis direction). Thus, the color filters 28 are arranged in a stripe form as a whole. The color filters 28 are superimposed on the pixel electrodes 24 on the array substrate 21 as seen in a plan view. Each of the light shielding portions 29 is interposed between adjoining two of the color filters 28 in the X-axis direction to serve as a color boundary between the two color filters 28. The light shielding portions 29 extend along the color filters 28 and the source lines 27. In the liquid crystal panel 11, the color filters 28 of R, G, and B arranged in the X-axis direction and the three pixel electrodes 24 disposed opposite the color filters 28 respectively constitute pixel portions PX of three colors. In the liquid crystal panel 11, the pixel portions PX of three colors, that is, R, G, and B adjoining to one another in the X-axis direction constitute display pixels that enable color display with a predetermined gradation. The pixel portions PX are arranged with, for example, about 50-μm pitches (specifically, 51.25-μm pitches) in the X-axis direction. The pixel portions PX are also arranged with, for example, about 150-μm pitches (specifically, 153.75-μm pitches) in the Y-axis direction.

Figure 4:
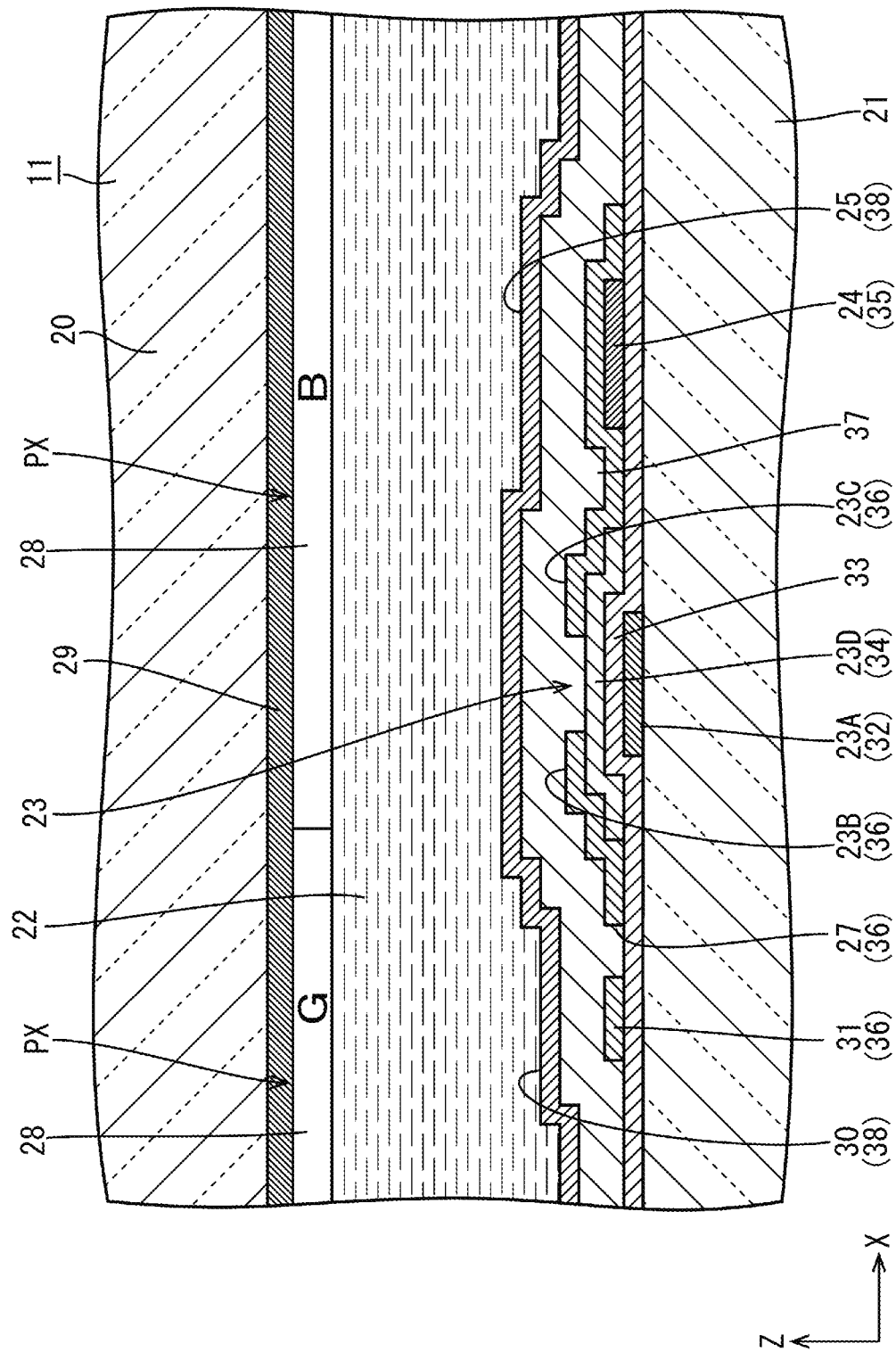
FIG. 4 is a sectional view of a TFT and its vicinity in the liquid crystal panel.

As illustrated in FIG. 4, the liquid crystal panel 11 includes a liquid crystal layer (a medium layer) 22 disposed between the CF substrate 20 and the array substrate 21. The liquid crystal layer 22 contains liquid crystal molecules that are substances whose optical characteristics vary in accordance with an applied electric field. The liquid crystal layer 22 is surrounded and sealed with a sealing part (not illustrated) interposed between the CF substrate 20 and the array substrate 21. A common electrode 25 is disposed on the inner face side of the array substrate 21, and is located above the pixel electrodes 24. The common electrode 25 consistently receives an almost constant reference potential, and extends in an approximately solid form over the almost entire display region AA. In addition, the common electrode 25 is superimposed on all the pixel electrodes 24 as seen in a plan view. The common electrode 25 has slits (not illustrated) opened at positions superimposed on the pixel electrodes 24. When the pixel electrodes 24 are electrically charged, a potential difference occurs between the pixel electrodes 24 and the common electrode 25. As a result, a fringe electric field (an oblique electric field) containing a component along the plate face of the array substrate 21 and a component normal to the plate face of the array substrate 21 is generated between an opening edge of each slit in the common electrode 25 and the corresponding pixel electrode 24. Therefore, the use of the fringe electric field allows control of an alignment state of the liquid crystal molecules in the liquid crystal layer 22. In other words, the liquid crystal panel 11 according to the first embodiment operates in a fringe-field switching (FFS) mode. Alignment films (not illustrated) for alignment of the liquid crystal molecules in the liquid crystal layer 22 are respectively formed on the innermost faces of the CF substrate 20 and array substrate 21, the innermost faces being in contact with the liquid crystal layer 22.

Next, a description will be given of the stack of various films formed on the inner face side of the array substrate 21. On the array substrate 21, as illustrated in FIG. 4, a first metal film 32, a gate insulating film 33, a semiconductor film 34, a first transparent electrode film (a conductive film, a transparent electrode film) 35, a second metal film (a conductive film, a metal film) 36, an interlayer insulating film (an insulating film, an insulating film between transparent electrode films) 37, and a second transparent electrode film 38 are stacked in this order from the lower-layer side (the glass substrate side). Each of the first metal film 32 and the second metal film 36 is a single-layer film made of a single metal material selected from copper, titanium, aluminum, molybdenum, tungsten, and the like. Alternatively, each of the first metal film 32 and the second metal film 36 is a multilayer film or an alloy made of different metal materials. Each of the first metal film 32 and the second metal film 36 thus has conductivity and a light shielding property. The first metal film 32 constitutes, for example, the gate lines 26 and the gate electrodes 23A of the TFTs 23. The second metal film 36 constitutes, for example, the source lines 27, the touch lines 31, and the source electrodes 23B and drain electrodes 23C of the TFTs 23. Each of the gate insulating film 33 and the interlayer insulating film 37 is made of an inorganic material such as a silicon nitride ($SiN_x$) or a silicon oxide ($SiO_2$). The gate insulating film 33 insulates the first metal film 32 located therebelow, from the semiconductor film 34, first transparent electrode film 35, and second metal film 36 located thereabove. The interlayer insulating film 37 insulates the semiconductor film 34, first transparent electrode film 35, and second metal film 36 located therebelow, from the second transparent electrode film 38 located thereabove. The semiconductor film 34 is a thin film made of, for example, an oxide semiconductor or amorphous silicon. The semiconductor film 34 constitutes, for example, the channel portions 23D of the TFTs 23. Each of the first transparent electrode film 35 and the second transparent electrode film 38 is made of a transparent electrode material such as an indium tin oxide (ITO) or an indium zinc oxide (IZO). The first transparent electrode film 35 constitutes, for example, the pixel electrodes 24. The second transparent electrode film 38 constitutes, for example, the common electrode 25. It should be noted that FIG. 4 illustrates only a contact portion of the pixel electrode 24 with the drain electrode 23C.

Figure 5:
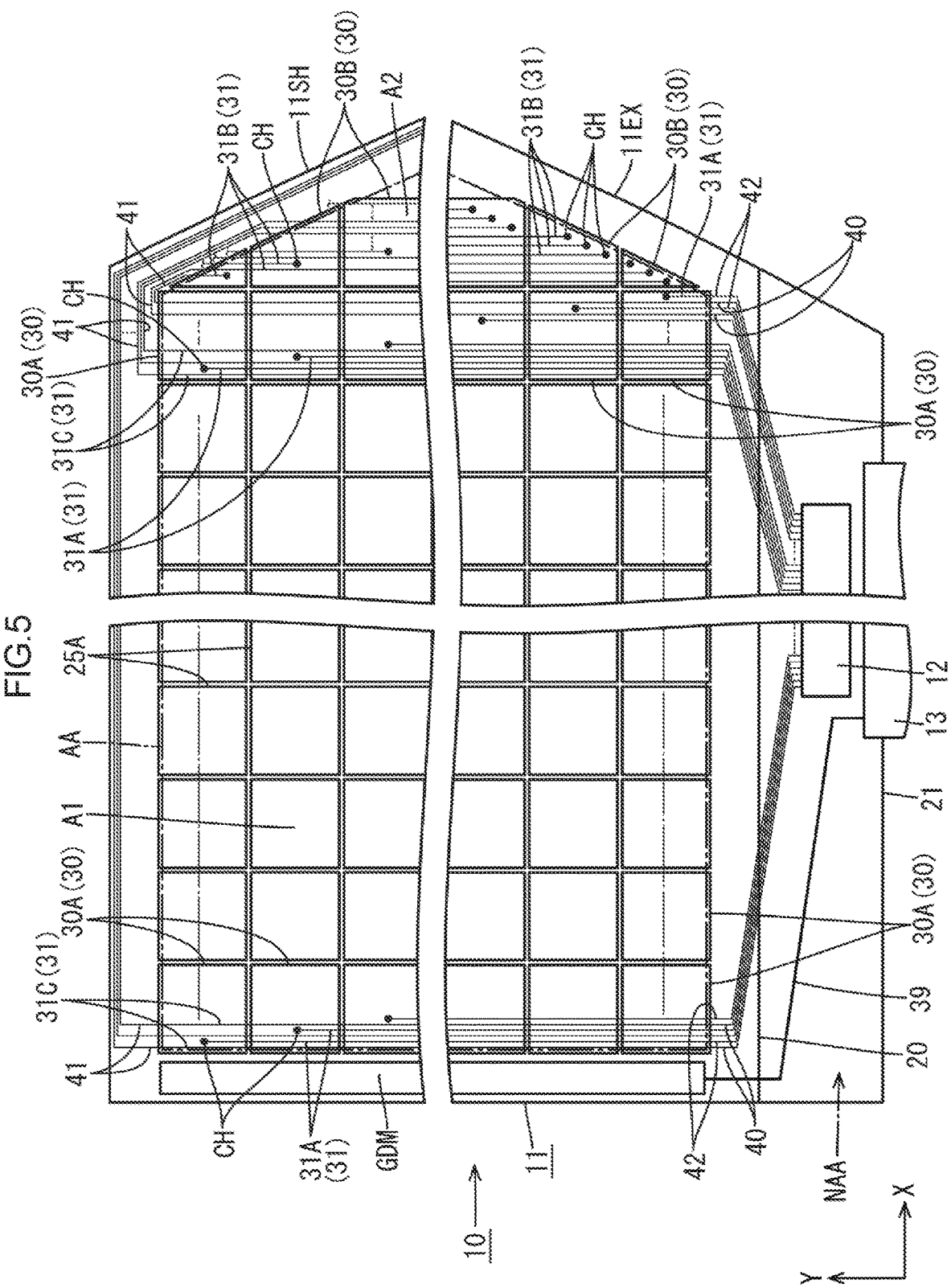
FIG. 5 is an enlarged plan view of four corners of the liquid crystal panel and their vicinities.

The liquid crystal panel 11 according to the first embodiment has the display function of displaying an image, and the touch panel function (the position input function) of detecting a position (an input position) to be input by a user based on a displayed image. In order to perform the touch panel function, the liquid crystal panel 11 is integrated with a touch panel pattern. In other words, the liquid crystal panel 11 is an in-cell touch panel. The touch panel pattern is of a so-called projected capacitance type, and a detection method thereof is of a self-capacitance type. As illustrated in FIG. 5, the touch panel pattern is provided on the array substrate 21 of the pair of substrates 20 and 21. The touch panel pattern is constituted of a plurality of touch electrodes (position detection electrodes) 30 disposed on the plate face of the array substrate 21 and arranged in a matrix form. The touch electrodes 30 are disposed on the array substrate 21 in the display region AA. In the liquid crystal panel 11, accordingly, the display region AA almost coincides with a touch region (a position input region) where an input position is detectable, and the non-display region NAA almost coincides with a non-touch region (a non-position input region) where an input position is not detectable. When the user makes his/her finger (a position input body) as a conductor (not illustrated) close to the front surface (the display surface) of the liquid crystal panel 11 for the purpose of inputting a position based on an image displayed on the liquid crystal panel 11 in the display region AA and visually recognized by the user, a capacitance is formed between the finger and the touch electrodes 30. Thus, the capacitance detected at the touch electrodes 30 located near the finger varies as the finger approaches the touch electrodes 30, so that the touch electrodes 30 located near the finger differ from the touch electrodes 30 located far from the finger. The use of this characteristic enables detection of the input position.

Figure 6:
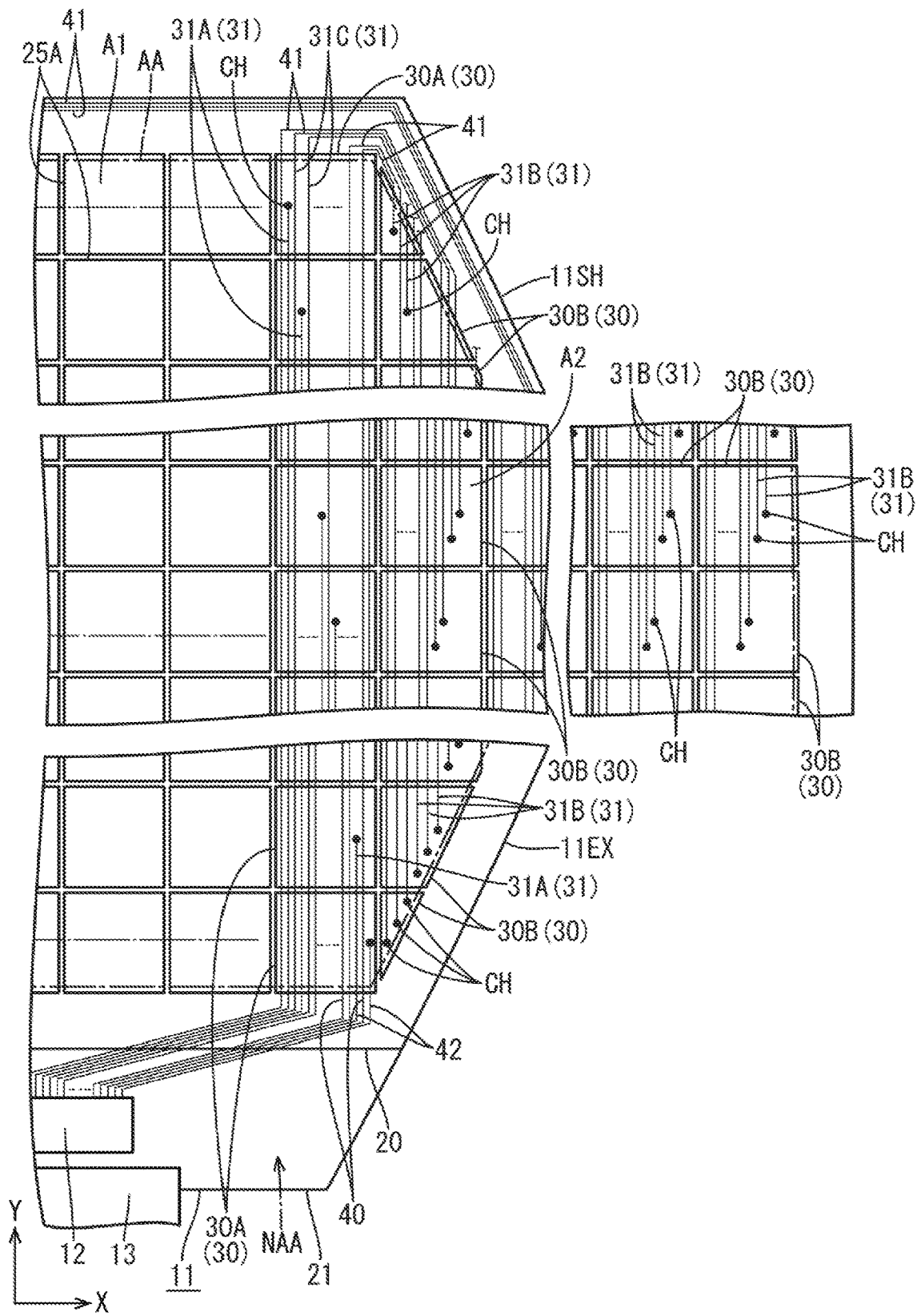
FIG. 6 is an enlarged plan view of a second region on the liquid crystal panel.
Figure 7:
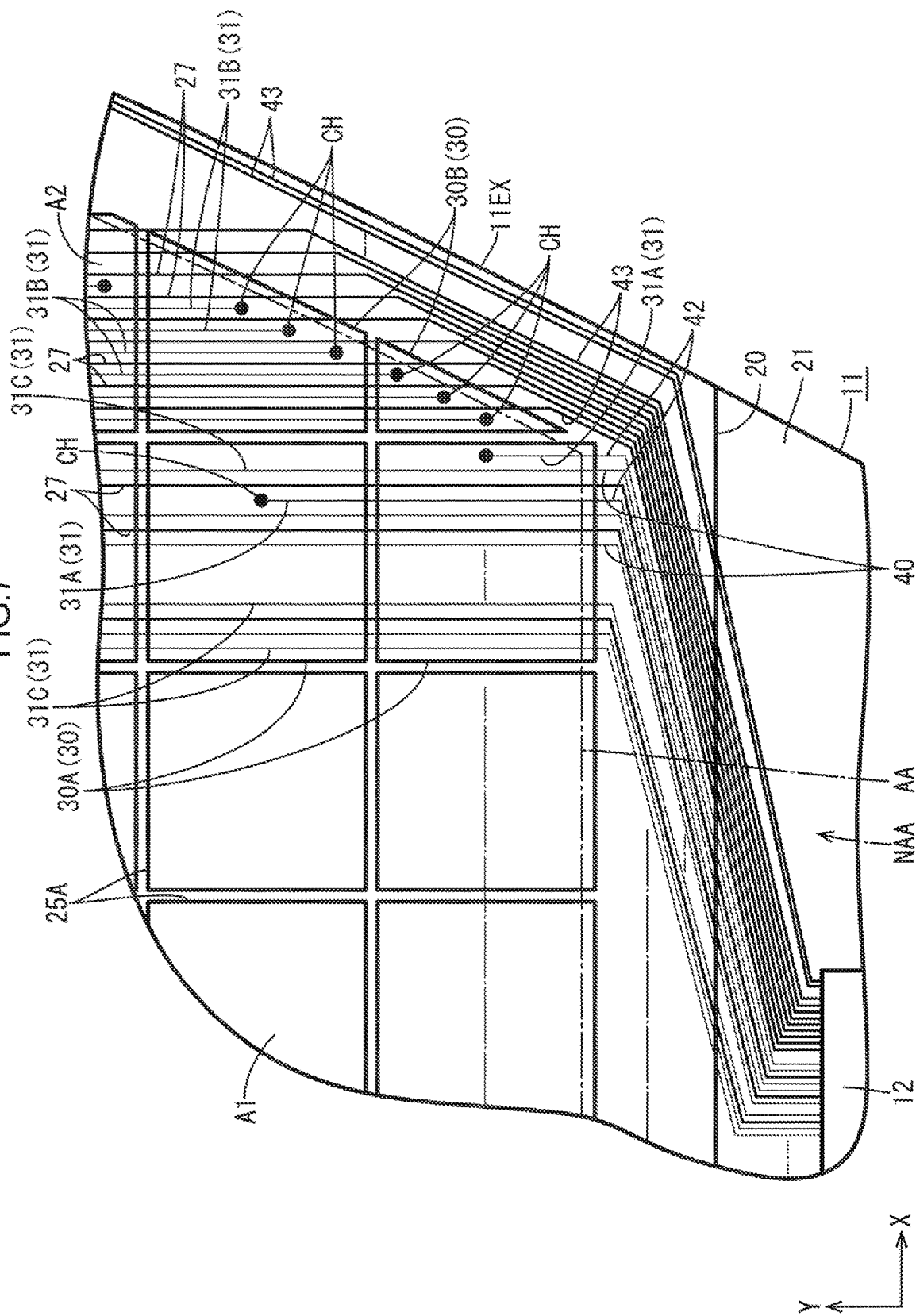
FIG. 7 is an enlarged plan view of the driver-side corner, and its vicinity, of the liquid crystal panel in the second region.

As illustrated in FIG. 5, the touch electrodes 30 are constituted of the common electrode 25 on the array substrate 21. The common electrode 25 has partition openings (partition slits) 25A each located between adjoining two of the touch electrodes 30, in addition to the slits described above. The partition openings 25A include portions extending horizontally over the entire common electrode 25 in the X-axis direction, and portions extending vertically over the entire common electrode 25 in the Y-axis direction. The partition openings 25A are formed in a substantially grid shape as a whole as seen in plan view. The common electrode 25 includes the plurality of touch electrodes 30 that are separated from one another by the partition openings 25A in a lattice shape as seen in a plan view, and are electrically independent of one another. The touch electrodes 30 into which the common electrode 25 partitions with the partition openings 25A are arranged in a matrix form in the X-axis direction and the Y-axis direction in the display region AA. Each of the touch electrodes 30 is formed in a substantially quadrangular shape as seen in a plan view. Each of the touch electrodes 30 measures several millimeters (e.g., about 5 mm) per side. Accordingly, the touch electrodes 30 are much larger in size than the pixel portions PX (the pixel electrodes 24) as seen in a plan view, and are arranged in a range covering multiple (e.g., several tens of or several hundreds of) pixel portions PX in the X-axis direction and the Y-axis direction. The plurality of touch lines (position detection lines) 31 on the array substrate 21 are selectively connected to the plurality of touch electrodes 30. The touch lines 31 and the source lines 27 are disposed on the same layer and are formed of the same material (the second metal film 36). The touch lines 31 extend along the source lines 27 in the Y-axis direction. The touch lines 31 are selectively connected to specific touch electrodes 30 among the plurality of touch electrodes 30 arranged in the Y-axis direction. In addition, the touch lines 31 are connected to a detection circuit (not illustrated). The detection circuit may be included in the driver 12 or may be disposed outside the liquid crystal panel 11 with the flexible printed circuit board 13 interposed between the detection circuit and the liquid crystal panel 11. Each of the touch electrodes 30 receives a reference potential signal (a signal) related to the display function and a touch signal (a position detection signal, a signal) related to the touch function, through the corresponding touch lines 31 at different timings. The reference potential signals are transmitted to all the touch lines 31 at the same timing. All the touch electrodes 30 at the reference potential thus function as the common electrode 25. FIGS. 5 to 7 each schematically illustrate the arrangement of the touch electrodes 30. The specific number of touch electrodes 30, the arrangement of the touch electrodes 30, the plane shape of each touch electrode 30, and the like may be changed appropriately in addition to those illustrated in FIGS. 5 to 7.

In the liquid crystal panel 11, the touch electrodes 30 and touch lines 31 in the first region A1 are different in configurations to those in the second region A2; therefore, a specific description will be given of the configurations. A description will also be given of the source lines 27. As illustrated in FIG. 5, the touch electrodes 30 include first touch electrodes (first position detection electrodes) 30A disposed on the first region A1, and second touch electrodes (second position detection electrodes) 30B disposed on the second region A2. The plurality of first touch electrodes 30A are arranged in a matrix form at almost equal intervals in the first region A1. In addition, each of the first touch electrodes 30A has a plane shape that is a quadrangular shape irrespective of the arrangement in the first region A1. In the first region A1, specifically, the number of first touch electrodes 30A to be arranged in the X-axis direction is, for example, 15, and the number of first touch electrodes 30A to be arranged in the Y-axis direction is, for example, 60. In other words, the number of first touch electrodes 30A is, for example, 900 in total. The plurality of second touch electrodes 30B are arranged in a matrix form at almost equal intervals in the second region A2. In addition, each of the second touch electrodes 30B has a plane shape that differs in accordance with the arrangement in the second region A2. Of the second touch electrodes 30B, second touch electrodes 30B that are in contact with the width increase section 11EX and the width decrease section 11SH in the second region A2 (that are located at an outer edge of the second region A2) each have a curved portion extending along the width increase section 11EX or the width decrease section 11SH. In other words, such a second touch electrode 30B has a plane shape that is an odd shape (a shape other than a rectangular shape). Of the second touch electrodes 30B, second touch electrodes 30B that are out of contact with the width increase section 11EX and the width decrease section 11SH in the second region A2 each have a plane shape that is a quadrangular shape as in the first touch electrodes 30A. The second touch electrodes 30B each having an odd shape are smaller in area than the second touch electrodes 30B each having a quadrangular shape. The second region A2 where the second touch electrodes 30B are disposed is located on the end of the first region A1 in the X-axis direction and includes the width increase section 11EX. Therefore, a distance from the driver 12 to the second touch electrodes 30B tends to be longer than a distance from the driver 12 to the first touch electrodes 30A on the first region A1. In the second region A2, the number of second touch electrodes 30B to be arranged in the X-axis direction is, for example, seven at maximum and, for example, one at minimum. In addition, the number of second touch electrodes 30B to be arranged in the Y-axis direction is, for example, 60 at maximum and, for example, 23 at minimum. In other words, the number of second touch electrodes 30B is, for example, 293 in total.

As illustrated in FIG. 5, the touch lines 31 include first-region touch lines (first-region lines) 31A, second-region touch lines (second lines, second-region lines) 31B, and through touch lines (lines) 31C. The first-region touch lines 31A are disposed on the first region A1 in the display region AA, and are connected to the first touch electrodes 30A. The second-region touch lines 31B are disposed on the second region A2 in the display region AA, and are connected to the second touch electrodes 30B. The through touch lines 31C are disposed on the first region A1 in the display region AA, and are not connected to the first touch electrodes 30A. The first-region touch lines 31A and the second-region touch lines 31B each formed of the second metal film 36 are respectively connected to the first touch electrodes 30A and the second touch electrodes 30B each formed of the second transparent electrode film 38, through contact holes CH opened at the interlayer insulating film 37 (see FIG. 4) formed above the first-region touch lines 31A and the second-region touch lines 31B. In FIGS. 5 to 7, black circles represent the contact holes CH. The number of first-region touch lines 31A is equal to or larger than the number of first touch electrodes 30A to be connected to the first-region touch lines 31A on the first region A1 in the display region AA. The number of second-region touch lines 31B is larger than the number of second touch electrodes 30B to be connected to the second-region touch lines 31B on the second region A2 in the display region AA. The number of through touch lines 31C is equal to the number of second-region touch lines 31B to be connected to the through touch lines 31C on the first region A1 in the display region AA. The through touch lines 31C extend vertically over all the first touch electrodes 30A arranged in the Y-axis direction on the first region A1 in the display region AA. However, the through touch lines 31C are not connected to the first touch electrodes 30A. The interlayer insulating film 37 (see FIG. 4) is interposed between the through touch lines 31C and the first touch electrodes 30A.

As illustrated in FIG. 5, first touch lead lines (first lead lines) 40 and second touch lead lines (second lead lines) 41 are disposed on the array substrate 21 in the non-display region NAA. The first touch lead lines 40 connect the driver 12 to ends, closer to the driver 12, of the through touch lines 31C. The second touch lead lines 41 connect ends, opposite to the ends closer to the driver 12, of the through touch lines 31C to ends, opposite to ends closer to the driver 12, of the second-region touch lines 31B. The first touch lead lines 40 are routed from the region where the driver 12 is mounted, toward the first region A1 in the display region AA so as to extend in a sector shape. The second touch lead lines 41 are routed in a folded form from the first region A1 toward the second region A2 in the display region AA. The wiring route of the second touch lead lines 41 extends along the outline of the array substrate 21 in the first region A1 and the second region A2. It can be said that the second touch lead lines 41 are connected to the second touch electrodes 30B through the second-region touch lines 31B. The number of first touch lead lines 40 is equal to the number of through touch lines 31C to be connected to the first touch lead lines 40. The number of second touch lead lines 41 is equal to and the number of second-region touch lines 31B to be connected to the second touch lead lines 41.

As illustrated in FIG. 5, first-region touch lead lines (first-region lead lines) 42 are disposed on the array substrate 21 in the non-display region NAA. The first-region touch lead lines 42 connect the driver 12 to ends, closer to the driver 12, of the first-region touch lines 31A. The first-region touch lead lines 42 are routed from the region where the driver 12 is mounted, toward the first region A1 in the display region AA so as to extend in a sector shape. The first-region touch lead lines 42 extend along the first touch lead lines 40. The driver 12 outputs a touch signal and a reference potential signal to each of the first touch electrodes 30A on the first region A1, through the corresponding first-region touch lead line 42 and the corresponding first-region touch line 31A. Each of the first touch electrodes 30A on the first region A1 functions based on these signals.

As illustrated in FIG. 7, source lead lines (display lead lines) 43 are disposed on the array substrate 21 in the non-display region NAA. The source lead lines 43 connect the driver 12 to ends, closer to the driver 12, of the source lines 27. In FIG. 7, for the sake of differentiation, the source lead lines 43 are depicted with solid lines bolder than solid lines representing the first touch lead lines 40 and first-region touch lead lines 42. The source lead lines 43 are routed from the region where the driver 12 is mounted, toward the first region A1 and the second region A2 in the display region AA so as to extend in a sector shape. Of the source lead lines 43, source lead lines 43 connected to the source lines 27 on the first region A1 in the display region AA extend along the first touch lead lines 40 and the first-region touch lead lines 42. Of the source lead lines 43, source lead lines 43 connected to the source lines 27 on the second region A2 in the display region AA extend approximately along the source lead lines 43 connected to the source lines 27 on the first region A1. In the display region AA, the second region A2 has an outline along the outline of the width increase section 11EX and the second region A2 is located on the end of the first region A1 in the X-axis direction. Therefore, the distance from the driver 12 to the second region A2 is longer than the distance from the driver 12 to the first region A1. The source lead lines 43 connected to the source lines 27 on the second region A2 in the display region AA are longer in the creepage distance from the driver 12 to the source lines 27 than the source lead lines 43 connected to the source lines 27 on the first region A1 in the display region AA.

Of the lead lines 40 to 43 described above, the first touch lead lines 40, the first-region touch lead lines 42, and the source lead lines 43 are disposed on a side closer to the driver 12 in the Y-axis direction with respect to the display region AA, as illustrated in FIGS. 5 to 7. In contrast to this, the second touch lead lines 41 are disposed on a side opposite to the side closer to the driver 12 in the Y-axis direction with respect to the display region AA. Specifically, the first touch lead lines 40, the first-region touch lead lines 42, and the source lead lines 43 are disposed on a region closer to the driver 12 than to the first region A1 in the display region AA. However, only the source lead lines 43 are disposed on a region closer to the driver 12 than to the second region A2 in the display region AA. Therefore, the wiring density at the region where the source lead lines 43 are disposed is lower than the wiring density at the region where the first touch lead lines 40, first-region touch lead lines 42, and source lead lines 43 are disposed. In addition, only the second touch lead lines 41 are disposed on a region opposite to the region closer to the driver 12 than to the first region A1 and the second region A2 in the display region AA. Therefore, the wiring density at the region where the second touch lead lines 41 are disposed is lower than the wiring density at the region where the first touch lead lines 40, first-region touch lead lines 42, and source lead lines 43 are disposed. It is assumed herein that lead lines are disposed to connect the ends, closer to the driver 12, of the second-region touch lines 31B to the driver 12. In this case, these lead lines are also disposed on the region closer to the driver 12 than to the second region A2 in the display region AA, in addition to the source lead lines 43. Therefore, the wiring density at this region becomes high. Moreover, a creepage distance of these lead lines from the driver 12 to the second region A2 is apt to become long owing to the width increase section 11EX of the second region A2. As described above, the lead lines for directly connecting, to the driver 12, the second-region touch line 31B connected to the second touch electrode 30B tend to cause an excessively long creepage distance and an excessively narrow line width, which may result in occurrence of a disconnection. In this regard, according to the first embodiment, the second touch electrodes 30B on the second region A2 receive a touch signal and a reference potential signal through the through touch lines 31C on the first region A1, the first touch lead lines 40 connected to the ends, closer to the driver 12, of the through touch lines 31C, the second touch lead lines 41 connected to the ends, opposite to the ends closer to the driver 12, of the through touch lines 31C, and the second-region touch lines 31B on the second region A2. This configuration therefore eliminates the necessity of the lead lines for directly connecting, to the driver 12, the second-region touch lines 31B connected to the second touch electrodes 30B. The second touch lead lines 41 are not disposed on the region from the driver 12 to the second region A2, so that the wiring density at this region is restrained to be low. This configuration secures a satisfactory wide line width between the second touch lead lines 41, eliminates the necessity to excessively narrow a line width between the source lead lines 43 on the region from the flexible printed circuit board 13 to the second region A2, and suppresses occurrence of disconnection at the second touch lead lines 41 and source lead lines 43.

With regard to the plurality of second touch electrodes 30B disposed on the second region A2 in the Y-axis direction, as illustrated in FIG. 6, the shorter the distance from the driver 12 to a second touch electrode 30B is, the larger the number of second-region touch lines 31B connected to the second touch electrode 30B is. Specifically, in the first embodiment, the plurality of second touch electrodes 30B arranged in the Y-axis direction are divided into, for example, three groups in accordance with a position in the Y-axis direction. As to a second touch electrode 30B belonging to the group farthest from the driver 12, the number of second-region touch lines 31B connected to the second touch electrode 30B is one. As to a second touch electrode 30B belonging to the group second farthest from (closest to) the driver 12, the number of second-region touch lines 31B connected to the second touch electrode 30B is two. As to a second touch electrode 30B belonging to the group closest to the driver 12, the number of second-region touch lines 31B connected to the second touch electrode 30B is three. The shorter the distance from the driver 12 to the second touch electrodes 30B on the second region A2 is, the longer signal supply paths for signals to be supplied to the second touch electrodes 30B on the second region A2 through the first touch lead lines 40, the through touch lines 31C, the second touch lead lines 41, and the second-region touch lines 31B are, so that the wiring resistance tends to become higher. In this regard, as to the plurality of second touch electrodes 30B disposed on the second region A2 in the Y-axis direction, the shorter the distance from the driver 12 to a second touch electrode 30B is, the larger the number of second-region touch lines 31B connected to the second touch electrode 30B is. Therefore, the wiring resistance is reduced even when the signal supply paths are long. With this configuration, signals to be supplied to the second touch electrodes 30B are less prone to be dulled.

As illustrated in FIG. 2, the first-region touch lines 31A and the through touch lines 31C extend along each other in the first region A1, and have the same positional relationship relative to the source lines 27 and the pixel electrodes 24. With this configuration, a parasitic capacitance between the first-region touch lines 31A and the source lines 27 or the pixel electrodes 24 on the first region A1 becomes equal to a parasitic capacitance between the through touch lines 31C and the source lines 27 or the pixel electrodes 24 on the first region A1. This configuration suppresses degradation in position detection sensitivity and display quality owing to the parasitic capacitance.

As illustrated in FIG. 5, the second region A2 includes, in addition to the width increase section 11EX, the width decrease section 11SH having a width that is decreased as being distanced from the driver 12. In the second region A2, therefore, the creepage distance of the second touch lead lines 41 connecting the through touch lines 31C to the second-region touch lines 31B connected to the second touch electrodes 30B is longer than a creepage distance in a case where the second region A2 does not include the width decrease section 11SH such that the width of the portion other than the width increase section 11EX is constant irrespective of the distance from the driver 12. However, since the second touch lead lines 41 are not disposed on the region from the driver 12 to the second region A2, the wiring density at this region is restrained to be low. This configuration secures a satisfactory wide line width between the second touch lead lines 41, eliminates the necessity to excessively narrow a line width between the source lead lines 43 on the region from the flexible printed circuit board 13 to the second region A2, and suppresses occurrence of disconnection at the second touch lead lines 41 and source lead lines 43.

As illustrated in FIGS. 2 and 4, the through touch lines 31C and the source lines 27 are disposed on the same layer so as to extend along each other. This configuration is superior in a reduction of manufacturing cost to a configuration in which the through touch lines and the source lines 27 are respectively disposed on different layers. In addition, the through touch lines 31C and the source lines 27 extend along each other, and therefore do not intersect with each other even when being disposed on the same layer. This configuration thus prevents occurrence of a short circuit.

The through touch lines 31C, the first touch lead lines 40, and the second touch lead lines 41 are formed of the second metal film 36 and are disposed on the same layer. This configuration eliminates necessity to form contact holes that need to be opened at an insulating film to be interposed between the through touch lines and both the lead lines in a case where the through touch lines and both the lead lines are respectively disposed on different layers. This configuration thus increases connection reliability.

The source lines 27 and the source lead lines 43 are formed of the second metal film 36 and are disposed on the same layer. This configuration eliminates necessity to form contact holes that need to be opened at an insulating film to be interposed between the source lines and the source lead lines in a case where the source lines and the source lead lines are respectively disposed on the different layers. This configuration thus increases connection reliability.

As described above, the liquid crystal display device (the display device) 10 according to the first embodiment includes the driver (the signal supply part) 12 configured to supply a signal, the array substrate (the substrate) 21 including the width increase section 11EX having a width that is increased as being distanced from the driver 12, the array substrate 21 having the first region A1, and the second region A2 located on the end of the first region A1 and including the width increase section 11EX, the display region AA where an image is displayed, the display region AA being located over the first region A1 and the second region A2 on the array substrate 21, the source line (the display line) 27 through which a signal for display is transmitted, the source line 27 being disposed on the display region AA, the through touch line (the line) 31C through which a signal is transmitted, the through touch line 31C being disposed on the first region A1, the second touch electrode (the position detection electrode) 30B disposed on the second region A2, the second touch electrode 30B serving as a signal receive part, the source lead line (the display lead line) 43 connected to the driver 12 and one end of the source line 27 close to the driver 12, the first touch lead line (the first lead line) 40 connected to the driver 12 and the end of the through touch line 31C close to the driver 12, and the second touch lead line (the second lead line) 41 connected to the second touch electrode 30B serving as the signal receive part and the end of the through touch line 31C opposite from the driver 12.

With this configuration, an image is displayed on the display region AA, based on a signal for display, the signal being transmitted through the source line 27. The second region A2 on the array substrate 21 is located on the end of the first region A1, and includes the width increase section 11EX. Therefore, a distance from the driver 12 to the second touch electrode 30B serving as the signal receive part on the second region A2 tends to be longer than a distance from the driver 12 to the second touch electrode 30B disposed on the first region A1. For this reason, in a case of providing lead lines for directly connecting the second touch electrodes 30B each serving as the signal receive part to the driver 12, the creepage distance of the lead lines may become excessively long. Moreover, the source lead line 43 connected to the source line 27 on the second region A2 is disposed on the region from the driver 12 to the second touch electrode 30B serving as the signal receive part on the second region A2. Therefore, in the case of providing the lead lines for directly connecting the second touch electrodes 30B each serving as the signal receive part to the driver 12, the wiring density becomes excessively high, so that the line width between the lead lines is apt to become narrow. As described above, the lead lines for directly connecting the second touch electrodes 30B each serving as the signal receive part to the driver 12 tend to cause an excessively long creepage distance and an excessively narrow line width, which may result in occurrence of a disconnection.

In contrast to this, the second touch electrode 30B serving as the signal receive part on the second region A2 receives signals through the through touch line 31C on the first region A1, the first touch lead line 40 connected to the end, closer to the driver 12, of the through touch line 31C, and the second touch lead line 41 connected to the end, opposite to the end closer to the driver 12, of the through touch line 31C. Therefore, this configuration eliminates necessity of the lead lines for directly connecting the second touch electrodes 30B each serving as the signal receive part to the driver 12. The second touch lead line 41 is not disposed on the region from the driver 12 to the second region A2, so that at least the wiring density at this region is restrained to be low. This configuration secures a satisfactory wide line width between the second touch lead lines 41, eliminates the necessity to excessively narrow a line width between the source lead lines 43 on the region from the flexible printed circuit board 13 to the second region A2, and suppresses occurrence of disconnection at the second touch lead lines 41 and source lead lines 43.

Second Embodiment

Figure 8:
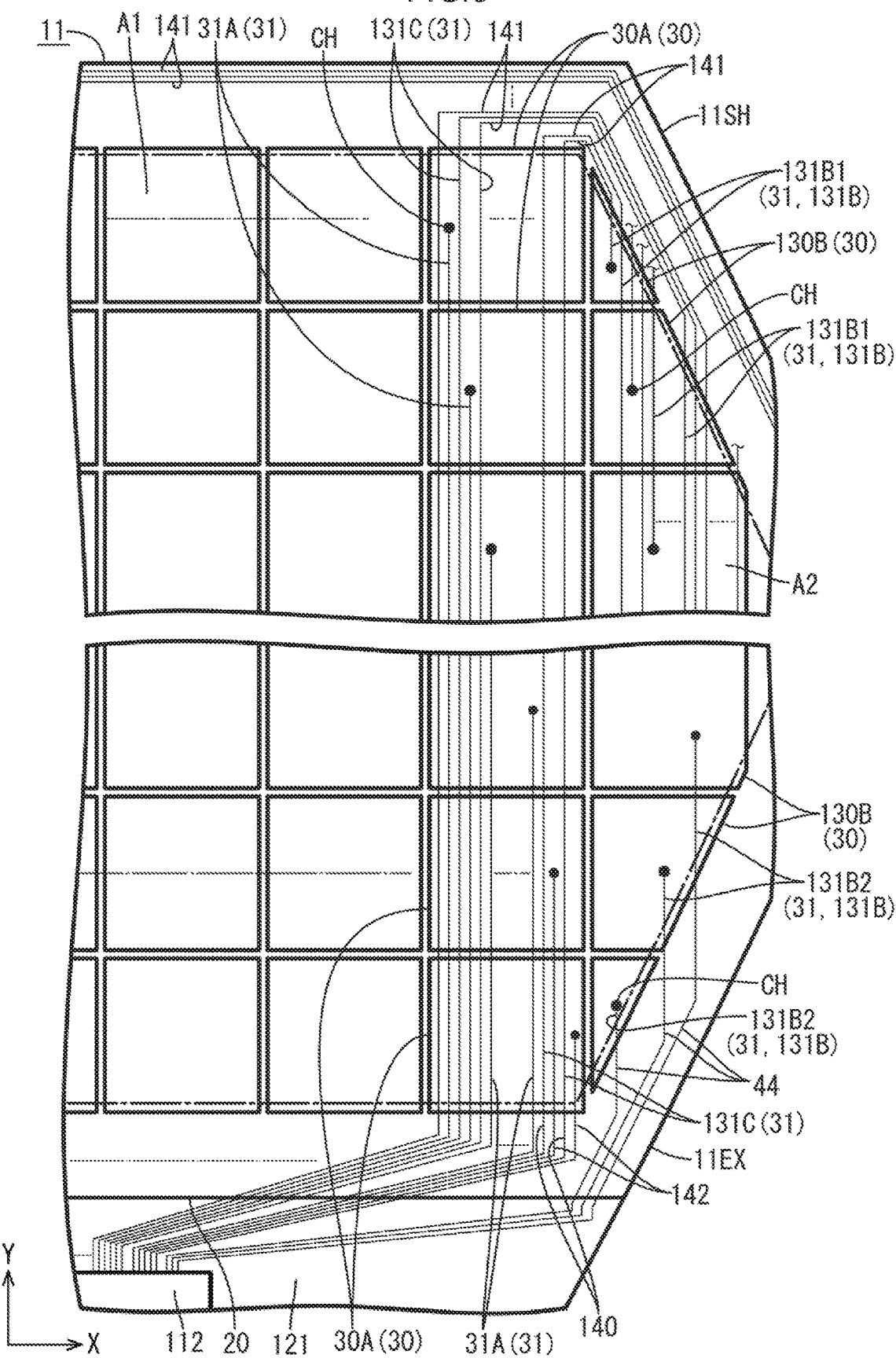
FIG. 8 is an enlarged plan view of a second region on a liquid crystal panel according to a second embodiment of the technology described herein.

With reference to FIG. 8, a second embodiment of the technology described herein will be described. The second embodiment exemplifies a case where some of second-region touch lines 131B are not connected to second touch lead lines 141. With regard to structures, functions, and effects similar to those described in the first embodiment, a duplicate description will not be given here.

As illustrated in FIG. 8, the second-region touch lines 131B include second-region touch lines 131B that are connected to the second touch lead lines 141, and second-region touch lines 131B that are not connected to the second touch lead lines 141. In the following description, the second-region touch lines 131B are distinguished in such a manner that the second-region touch lines 131B connected to the second touch lead lines 141 are referred to as "second-region first touch lines 131B1", and the second-region touch lines 131B not connected to the second touch lead lines 141 are referred to as "second-region second touch lines 131B2". In addition, the second-region touch lines 131B are collectively called without addition of such numerical subscripts "1" and "2" to the reference sign "131B". As in the second-region touch lines 31B described in the first embodiment, the second-region first touch lines 131B1 have ends connected to the second touch lead lines 141, the ends being opposite to ends, closer to a driver 112, of the second-region first touch lines 131B1. In contrast to this, the second-region second touch lines (third lines) 131B2 have ends connected to third touch lead lines 44 disposed on an array substrate 121 in a non-display region NAA, the ends being closer to the driver 112. The third touch lead lines 44 have first ends respectively connected to the second-region second touch lines 131B2, and second ends each connected to the driver 112. The third touch lead lines 44 are routed approximately along first touch lead lines 140 and first-region touch lead lines 142. As described above, the ends, closer to the driver 112, of the second-region second touch lines 131B2 are connected to the driver 112 through the third touch lead lines 44. The second-region second touch lines 131B2 therefore receive various signals from the driver 112 through the third touch lead lines 44. With this configuration, second touch electrodes 130B disposed on a second region A2 and connected to the second-region second touch lines 131B2 are shorter in lengths of signal supply paths than second touch electrodes 130B disposed on the second region A2 and connected to the second-region first touch lines 131B1, resulting in a reduction of wiring resistance.

In the second region A2, of the plurality of second touch electrodes 130B arranged in the Y-axis direction, second touch electrodes 130B disposed farther from the driver 112 are respectively connected to the second-region first touch lines 131B1, whereas second touch electrodes 130B disposed closer to the driver 112 are respectively connected to the second-region second touch lines 131B2. In other words, the second touch electrodes 130B connected to the second-region second touch lines 131B2 are disposed closer to the driver 112 than the second touch electrodes 130B connected to the second-region first touch lines 131B1 are. The shorter the distance from the driver 112 to the second touch electrodes 130B on the second region A2 is, the longer the signal supply paths for signals to be supplied to the second touch electrodes 130B on the second region A2 through the first touch lead lines 140, the through touch lines 131C, the second touch lead lines 141, and the second-region first touch lines 131B1 are, so that the wiring resistance tends to become higher. In this regard, the second touch electrodes 130B disposed closer to the driver 112 than the second touch electrodes 130B connected to the second-region first touch lines 131B1 in the second region A2 are receive signals through the second-region second touch lines 131B2 and the third touch lead lines 44, resulting in a reduction of the wiring resistance more efficiently.

Third Embodiment

Figure 9:
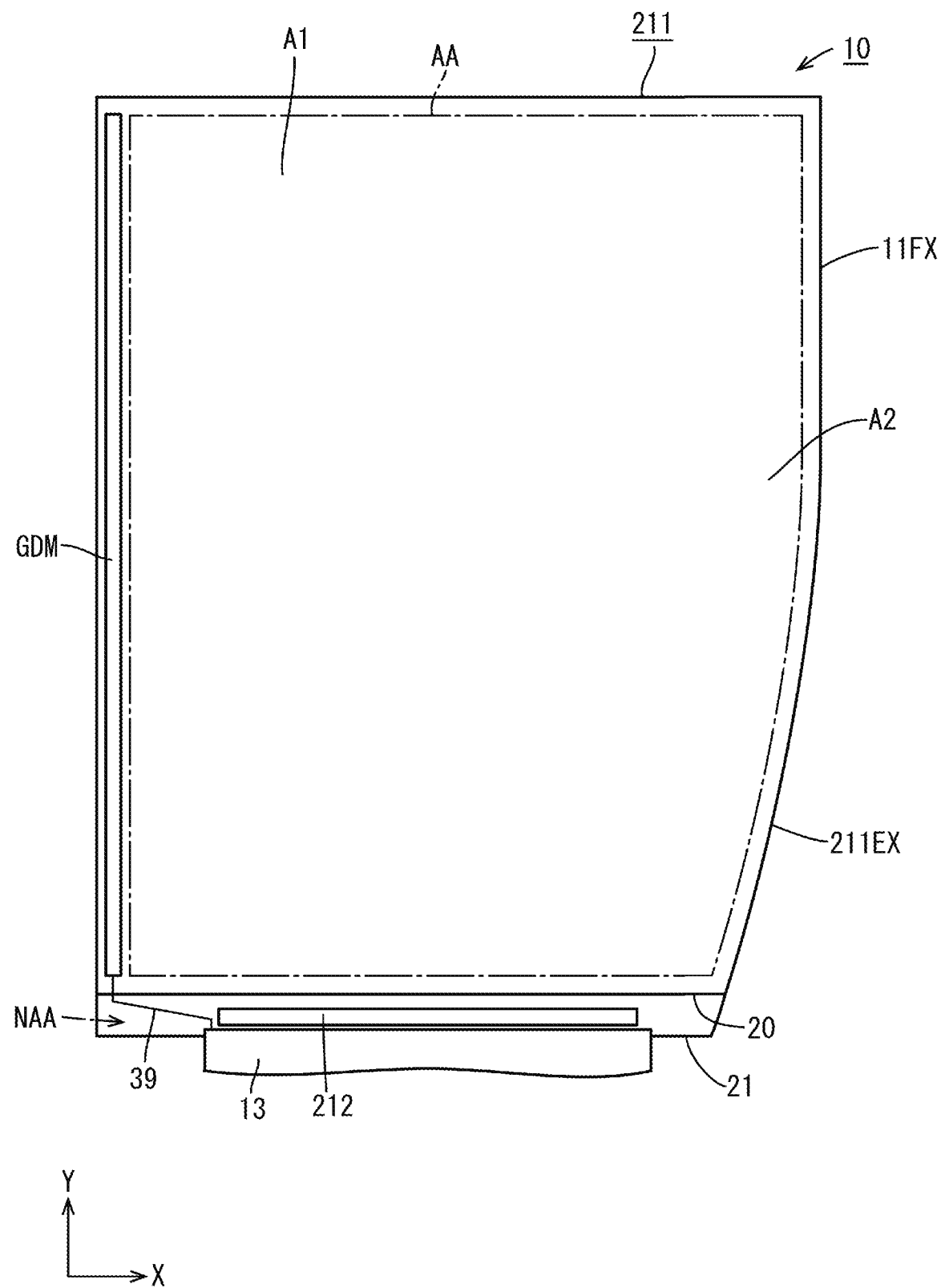
FIG. 9 is a plan view of a liquid crystal panel according to a third embodiment of the technology described herein.
Figure 10:
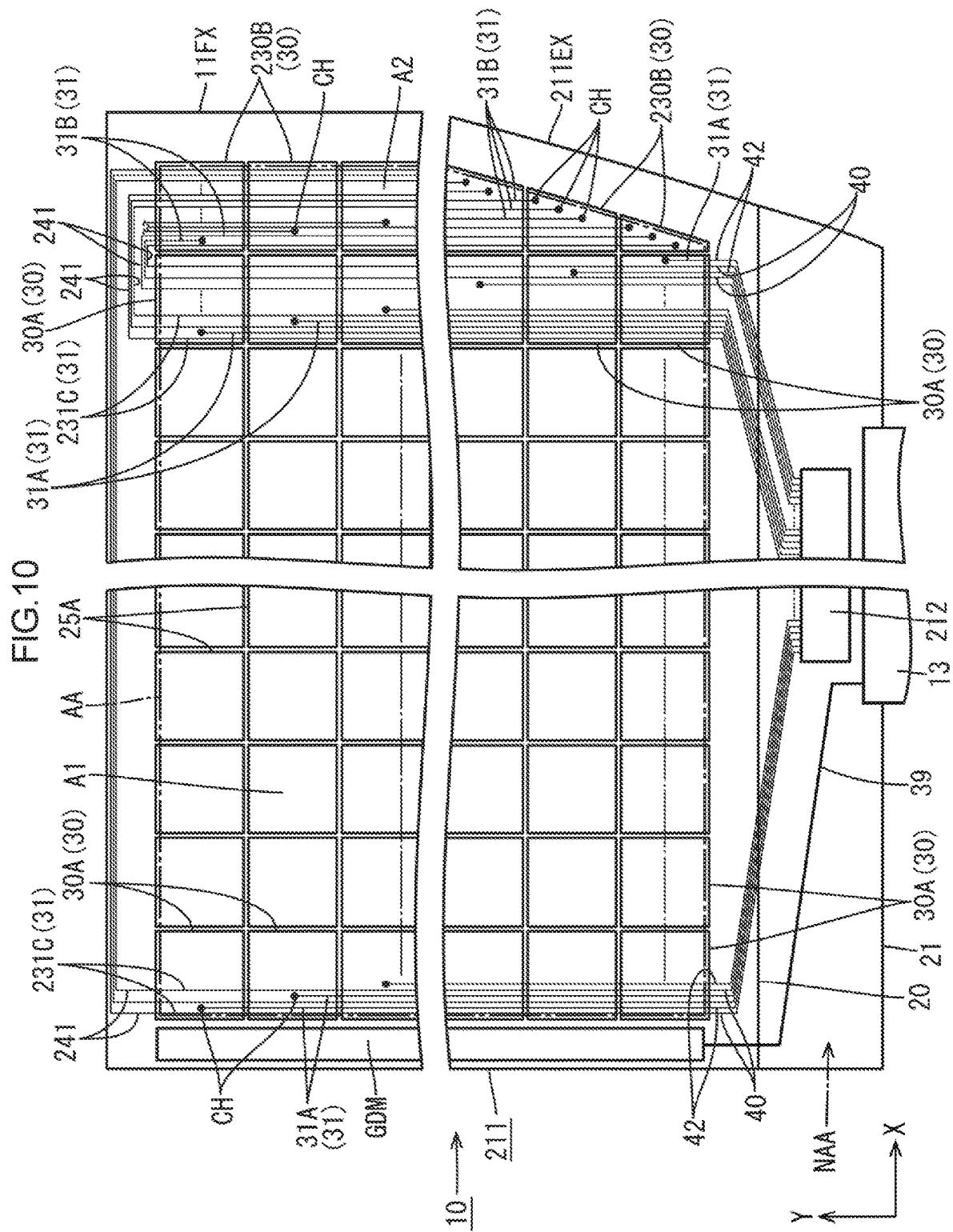
FIG. 10 is an enlarged plan view of four corners of the liquid crystal panel and their vicinities.

With reference to FIGS. 9 and 10, a third embodiment of the technology described herein will be described. The third embodiment is different from the first embodiment in the outline of a liquid crystal panel 211. With regard to structures, functions, and effects similar to those described in the first embodiment, a duplicate description will not be given here.

As illustrated in FIG. 9, the liquid crystal panel 211 according to the third embodiment has an outline as follows. The liquid crystal panel 211 includes a width increase section 211EX in a second region A2, but does not include the width decrease section 11SH (see FIG. 1) described in the first embodiment. Specifically, the liquid crystal panel 211 includes, in the second region A2, a constant width section 11FX having a constant width irrespective of a distance from a driver 212. With respect to an elongated direction of the outline of second region A2, the second region A2 includes a portion close to the driver 212 in the Y-axis direction as the width increase section 211EX and a portion far away from the driver 212 in the Y-axis direction as the constant width section 11FX. As illustrated in FIG. 10, with this configuration, a creepage distance of second touch lead lines 241 connecting through touch lines 231C to second touch electrodes 230B becomes shorter than a creepage distance in a case where the liquid crystal panel 211 includes the width decrease section 11SH in the second region A2 as described in the first embodiment. This configuration thus suppresses occurrence of a disconnection more suitably.

Fourth Embodiment

Figure 11:
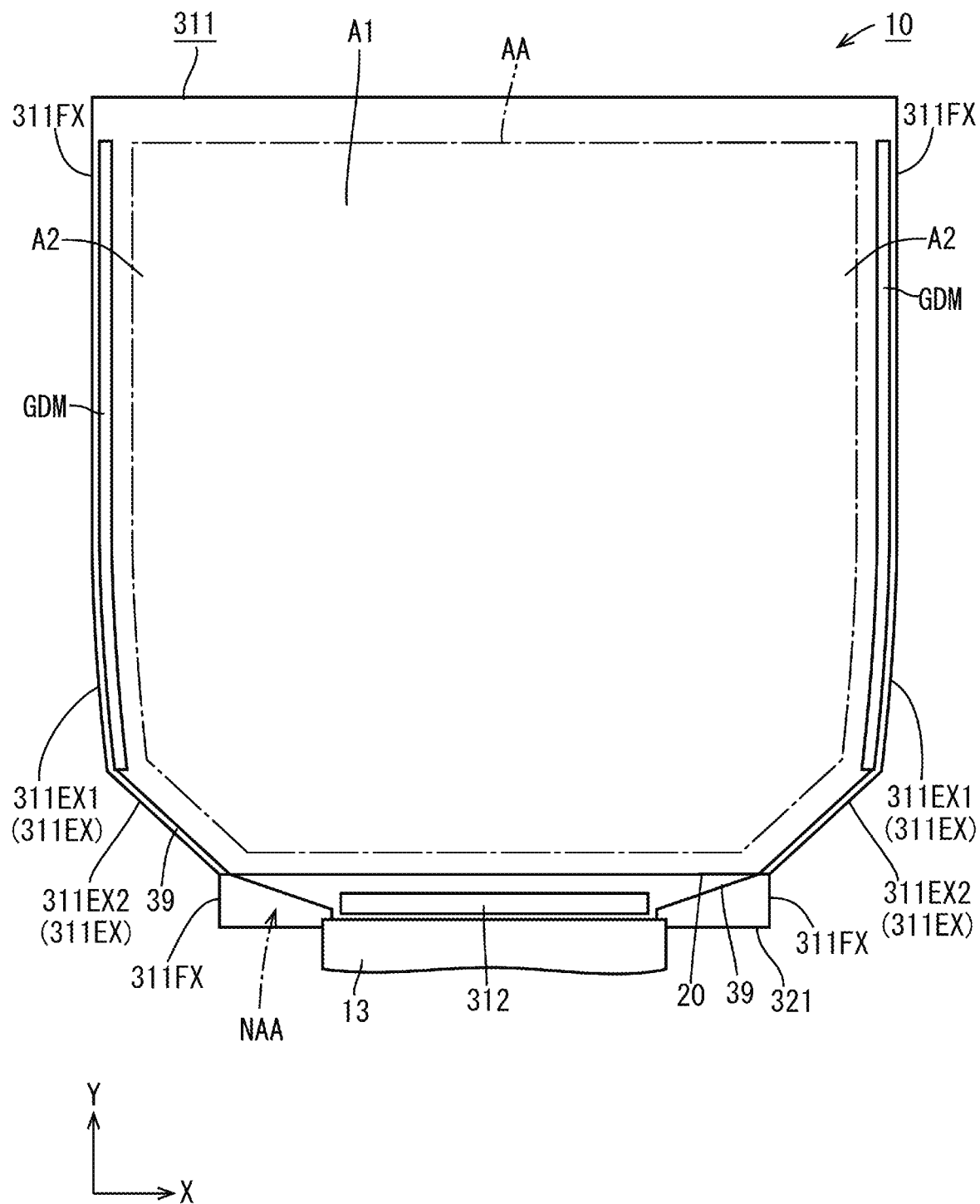
FIG. 11 is a plan view of a liquid crystal panel according to a fourth embodiment of the technology described herein.
Figure 12:
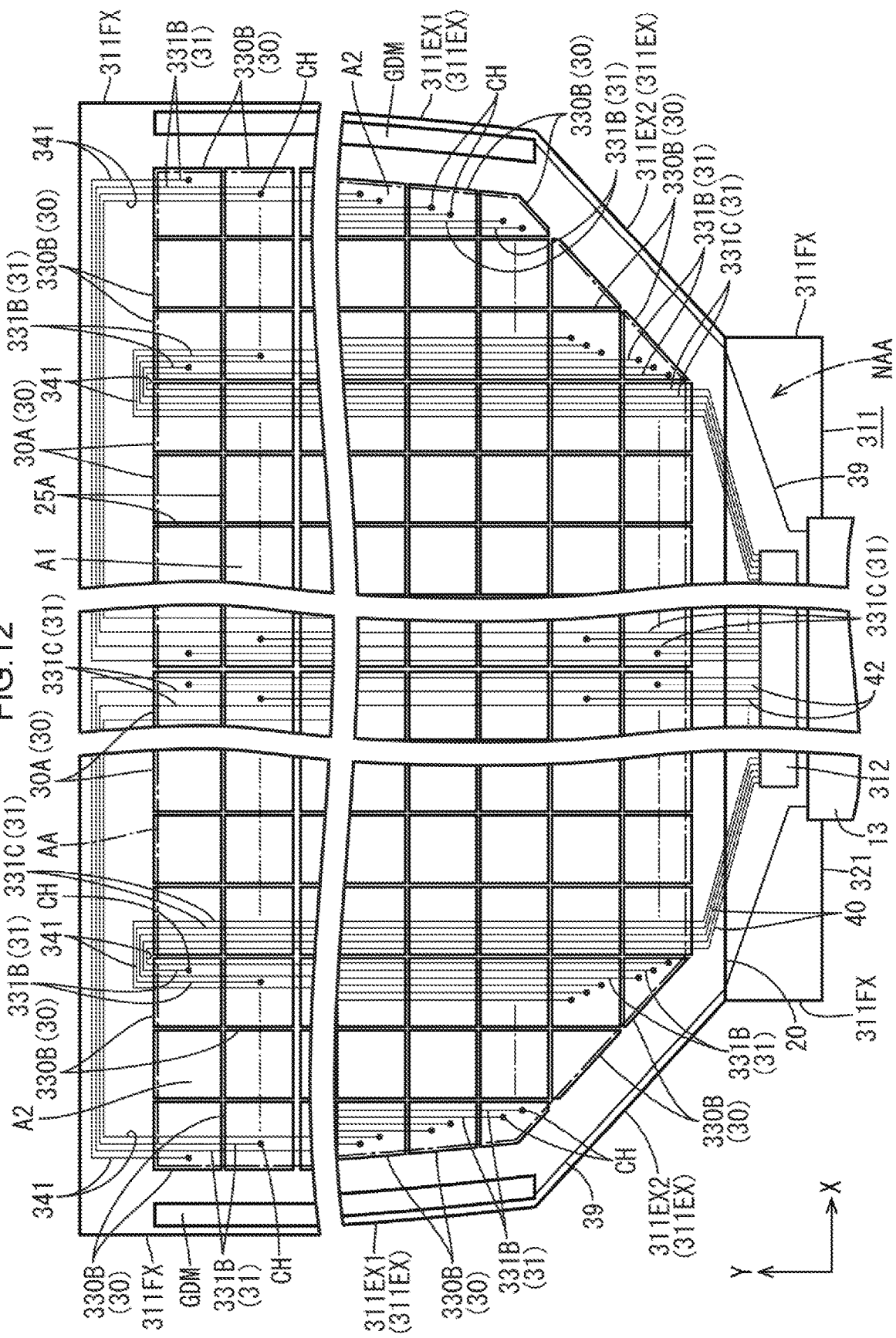
FIG. 12 is an enlarged plan view of a first region and a second region on the liquid crystal panel.

With reference to FIGS. 11 and 12, a fourth embodiment of the technology described herein will be described. The fourth embodiment is different from the third embodiment in the number of second regions A2 and the outline of a liquid crystal panel 311 in each second region A2. With regard to structures, functions, and effects similar to those described in the third embodiment, a duplicate description will not be given here.

As illustrated in FIG. 11, in the liquid crystal panel 311 according to the fourth embodiment, an array substrate 321 has a first region A1, and the pair of second regions A2 respectively include width increase sections 311EX. The second regions A2 are respectively located on opposite ends of the first region A1 in the X-axis direction. With respect to an elongated direction of the outline of the second region A2, each of the second regions A2 includes a portion farthest from a driver 312 in the Y-axis direction and a portion closest to the driver 312 in the Y-axis direction respectively as constant width sections 311FX and a portion between the constant width sections 311FX as the width increase section 311EX. In each of the second regions A2, the constant width section 311FX close to the driver 312 in the Y-axis direction is narrower in width than the constant width section 311FX far away from the driver 312 in the Y-axis direction. In each of the second regions A2, the width increase section 311EX is bent at some midpoint therein. The width increase section 311EX includes a curved portion 311EX1 and a linear portion 311EX2. The curved portion 311EX1 corresponds to a portion farther from the driver 312 with respect to the bent position regarded as a boundary, and is formed in a gently curved shape as seen in a plan view. The linear portion 311EX2 corresponds to a portion closer to the driver 312, and is formed in a linear shape as seen in a plan view. The curved portion 311EX1 has a width change rate that gradually decreases as the curved portion 311EX1 is distanced from the driver 312. In constant to this, the linear portion 311EX2 has an almost fixed width change rate that is higher than the maximum value of the width change rate of the curved portion 311EX1. Gate circuit parts GDM are respectively disposed on the second regions A2 with a display region AA sandwiched therebetween in the X-axis direction. Each of the gate circuit parts GDM is formed in a range covering the constant width section 311FX farther from the driver 312 in the Y-axis direction and the curved portion 311EX1 of the width increase section 311EX. Each of the gate circuit parts GDM is also formed to extend along the constant width sections 311FX and the curved portion 311EX1. In other words, each of the gate circuit parts GDM is bent at the boundary position between the constant width section 311FX and the curved portion 311EX1.

As illustrated in FIG. 12, a plurality of second touch electrodes 330B and a plurality of second-region touch lines 331B are disposed on each of the second region A2 in the display region AA. Second touch lead lines 341 are connected to ends, opposite to ends closer to the driver 312, of the second-region touch lines 331B on each of the second regions A2. The second touch lead lines 341 are connected to ends, opposite to ends closer to the driver 312, of through touch lines 331C on the first region A1. The through touch lines 331C disposed at a center of the first region A1 in the X-axis direction are connected, through the second touch lead lines 341, to the second-region touch lines 331B connected to the second touch electrodes 330B disposed on an end of each of the second regions A2 in the X-axis direction. In contrast to this, the through touch lines 331C disposed on opposite ends of the first region A1 in the X-axis direction are connected, through the second touch lead lines 341, to the second-region touch lines 331B connected to the second touch electrodes 330B disposed at a center of each of the second regions A2 in the X-axis direction. As described above, the second touch lead lines 341 are disposed to form a laterally symmetrical shape as illustrated in FIG. 12.

Fifth Embodiment

Figure 13:
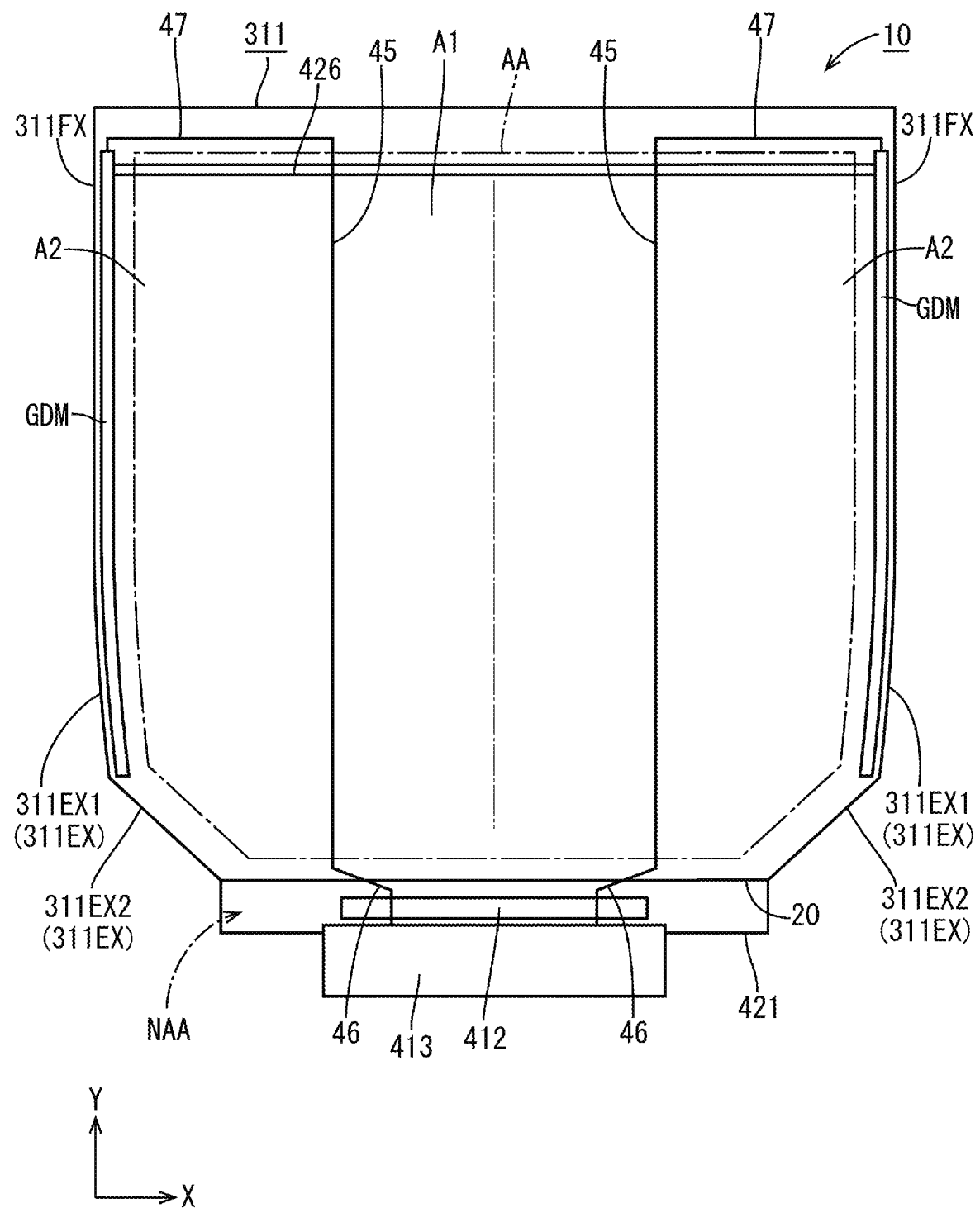
FIG. 13 is a plan view of a liquid crystal panel according to a fifth embodiment of the technology described herein.

With reference to FIG. 13, a description will be given of a fifth embodiment of the technology described herein. The fifth embodiment is different from the fourth embodiment in the connection form of gate circuit parts GDM. With regard to structures, functions, and effects similar to those described in the fourth embodiment, a duplicate description will not be given here.

As illustrated in FIG. 13, an array substrate 421 according to the fifth embodiment includes a pair of through gate circuit connection lines (lines) 45, a pair of first gate circuit lead lines (first lead lines) 46, and a pair of second gate circuit lead lines (second lead lines) 47 in order to supply signals from a region where a flexible printed circuit (signal supply part) 413 is mounted, to each gate circuit part (display circuit part) GDM. The through gate circuit connection lines 45 extend, like through lines (not illustrated), vertically over all first touch electrodes (not illustrated) in the Y-axis direction on a first region A1 in a display region AA. However, the through gate circuit connection lines 45 are not connected to the first touch electrodes. The first gate circuit lead lines 46 are routed from a region where the flexible printed circuit 413 is mounted, to the first region A1 in the display region AA, via a region where a driver 412 is mounted. The first gate circuit lead lines 46 are connected to ends, closer to the flexible printed circuit 413, of the through gate circuit connection lines 45. The portion where the first gate circuit lead lines 46 are routed via the region where the driver 412 is mounted preferably corresponds to a region where terminals for supplying signals to source lead lines (not illustrated) are not formed. The second gate circuit lead lines 47 are connected to ends, opposite to ends closer to the flexible printed circuit 413, of the through gate circuit connection lines 45 and ends, opposite to ends closer to the flexible printed circuit 413, of the gate circuit parts GDM. It can be said that the second gate circuit lead lines 47 are directly connected to the gate circuit parts GDM as connection targets. The second gate circuit lead lines 47 are routed in a folded form from the first region A1 to the second region A2 in the display region AA. The wiring route of the second gate circuit lead lines 47 extends along the outline of the array substrate 421 in the first region A1 and the second region A2.

With this configuration, the gate circuit parts GDM on the second region A2 receive signals from the flexible printed circuit 413 through the first gate circuit lead lines 46, the through gate circuit connection lines 45, and the second gate circuit lead lines 47. The gate circuit parts GDM therefore supply scanning signals (signals) for display, to gate lines (second display lines) 426. Accordingly, the fifth embodiment eliminates the necessity of the gate circuit connection line 39 (see FIG. 1) for directly connecting the gate circuit part GDM to the flexible printed circuit 413, unlike the first embodiment. The second gate circuit lead lines 47 are not disposed on the region from the flexible printed circuit 413 to the second region A2, so that the wiring density at this region is restrained to be low. This configuration secures a satisfactory wide line width between the second gate circuit lead lines 47, eliminates the necessity to excessively narrow a line width between the source lead lines in the region from the flexible printed circuit 413 to the second region A2, and suppresses occurrence of disconnection at the second gate circuit lead lines 47.

Sixth Embodiment

Figure 14:
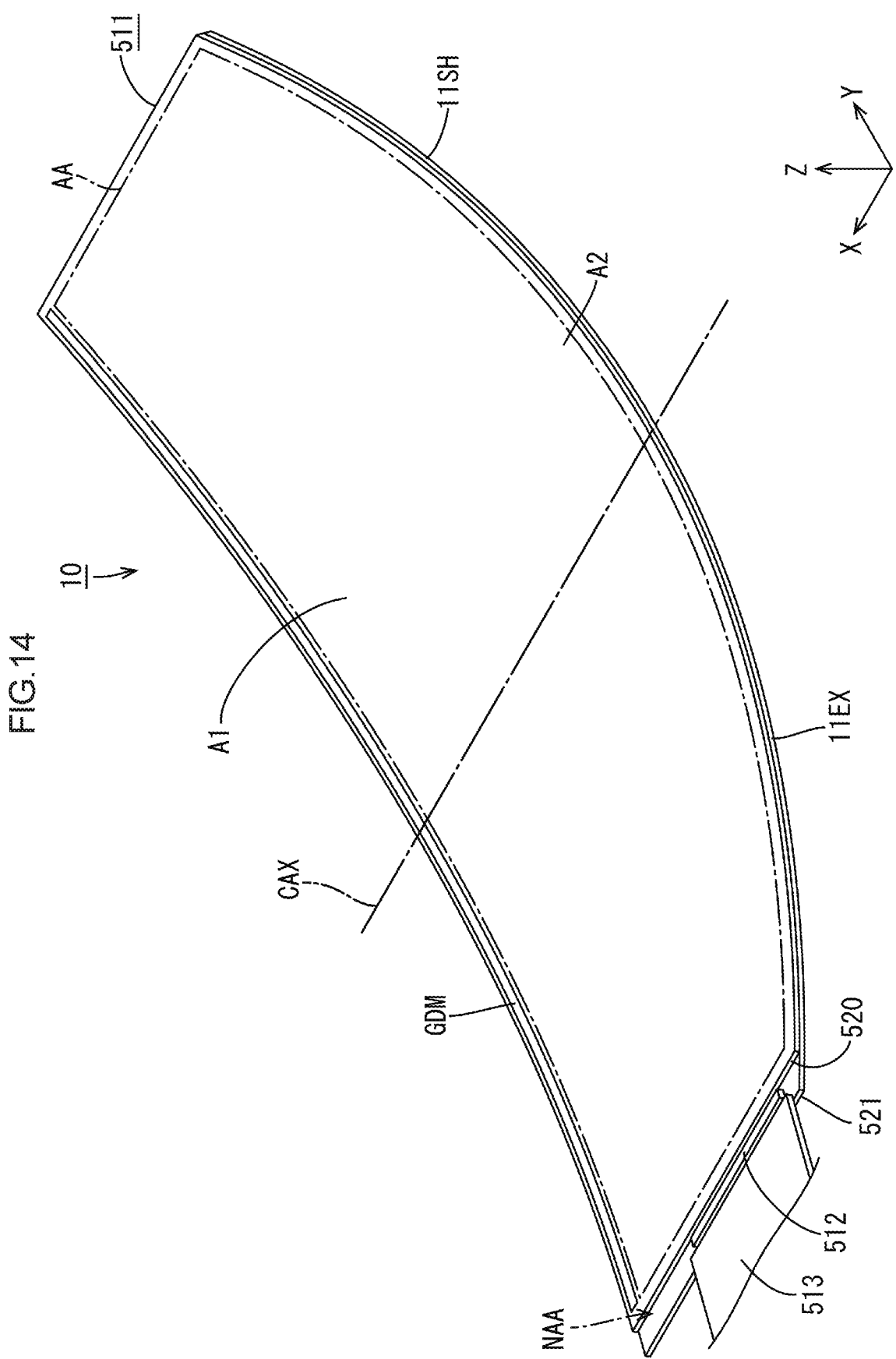
FIG. 14 is a perspective view of a liquid crystal panel according to a sixth embodiment of the technology described herein.
Figure 15:
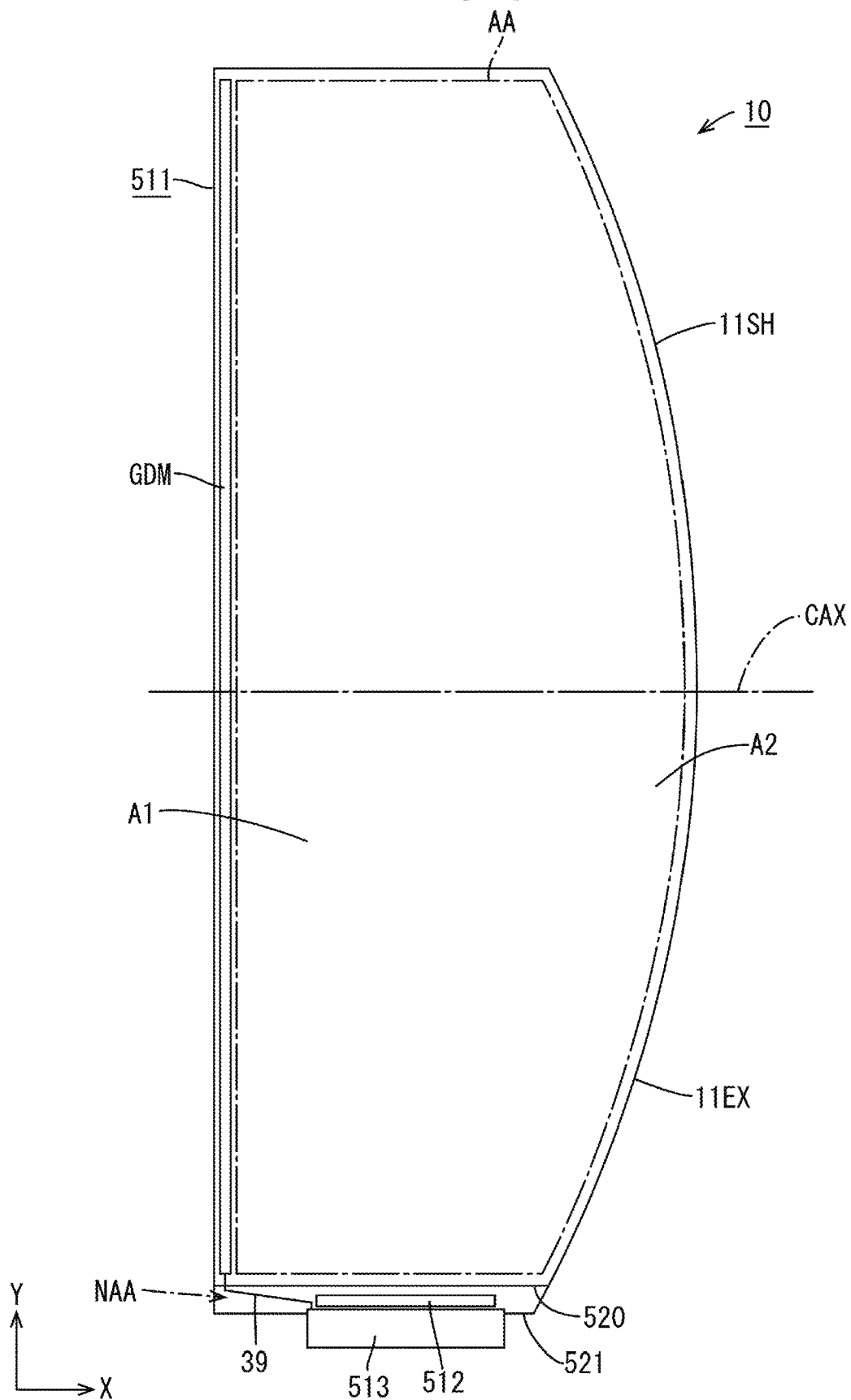
FIG. 15 is a plan view of the liquid crystal panel.

With reference to FIG. 14 or 15, a description will be given of a sixth embodiment of the technology described herein. The sixth embodiment is different from the first embodiment in that a liquid crystal panel 511 is curved. With regard to structures, functions, and effects similar to those described in the first embodiment, a duplicate description will not be given here.

As illustrated in FIGS. 14 and 15, the liquid crystal panel 511 according to the sixth embodiment is curved in a substantially arc shape as a whole. Specifically, a center of the liquid crystal panel 511 in the longer edge direction (the Y-axis direction) is bowed toward the back side. The longer edge direction corresponds to a direction in which through touch lines extend. On the other hand, opposite ends of the liquid crystal panel 511 in the longer edge direction are protruded toward the front side. In other words, the liquid crystal panel 511 is formed in an inwardly warped shape. The liquid crystal panel 511 has a curve axis CAX of which the axis direction coincides with the X-axis direction (the perpendicular direction perpendicular to the direction in which the through touch lines 31C extend). Accordingly, a direction along which the liquid crystal panel 511 is curved (a direction along which a curvature of a plate face changes) coincides with the longer edge direction (the Y-axis direction, the direction in which the through touch lines extend). The curve axis CAX of the liquid crystal panel 511 is located on a side closer to a CF substrate 520 opposite to an array substrate 521 in the Z-axis direction. In other words, the CF substrate 520 is located closer to the curve axis CAX than the array substrate 521 is, in the Z-axis direction. Accordingly, it can be said that each of the array substrate 521 and the CF substrate 520 constituting the liquid crystal panel 511 is curved around the curve axis CAX such that the plate face thereof extends along the shorter edge direction of a pixel electrode (see FIG. 2). As described above, when the array substrate 521 and the CF substrate 520 are curved around the curve axis CAX, the positional relationship between color filters on the CF substrate 520 and pixel electrodes on the array substrate 521 may vary in the direction along which the array substrate 521 and the CF substrate 520 are curved. In this regard, the array substrate 521 and the CF substrate 520 are curved around the curve axis CAX extending along the shorter edge direction of each pixel electrode, i.e., the direction in which a plurality of color filters providing different colors are arranged (the X-axis direction, the perpendicular direction). Therefore, even when the positional relationship between the color filters and the pixel electrodes varies in the direction along which the array substrate 521 and the CF substrate 520 are curved as the array substrate 521 and the CF substrate 520 are curved, the liquid crystal panel 511 is less prone to cause color mixing because of the following reasons. That is, the color filters of the same color extend in the direction along which the array substrate 521 and the CF substrate 520 are curved, and the pixel portions providing the same color are arranged in the direction along which the array substrate 521 and the CF substrate 520 are curved (see FIG. 3). In addition, a driver 512 is disposed such that the longer edge direction extends along the curve axis CAX (the X-axis direction, the perpendicular direction). Therefore, the driver 512 is less susceptible to deformation due to the curvature of the array substrate 521 and CF substrate 520. Further, stress to be applied to the array substrate 521 due to the curvature of the liquid crystal panel 511 is less susceptible to influence of the driver 512 and a flexible printed circuit 513, and is therefore equalized in the Y-axis direction with ease. The color filters, the pixel electrodes, and the like are equal in configurations to those described in the first embodiment with reference to FIGS. 2 and 3.

Other Embodiments

The technology described herein is not limited to the embodiments described above and with reference to the drawings. The following embodiments may be included in the technical scope.

(1) In each of the foregoing embodiments, the number of groups for the second touch electrodes that are different from one another in the number of second-region touch lines connected thereto is not particularly limited, but may be appropriately changed. In addition, the number of second-region touch lines to be connected to one second touch electrode is not particularly limited, but may be appropriately changed.

(2) In each of the foregoing embodiments, the number of second-region touch lines is larger than the number of second touch electrodes to be connected to the second-region touch lines, in the second region. Alternatively, the number of second-region touch lines may be equal to the number of second touch electrodes to be connected to the second-region touch lines, in the second region.

(3) In each of the foregoing embodiments, the number of first-region touch lines is equal to the number of first touch electrodes to be connected to the first-region touch lines, in the first region. Alternatively, the number of first-region touch lines may be larger than the number of first touch electrodes to be connected to the first-region touch lines, in the first region. In such a case, preferably, the number of first-region touch lines connected to the first touch electrodes farther from the driver is larger than the number of first-region touch lines connected to the first touch electrodes closer to the driver.

(4) In each of the foregoing embodiments, the first-region touch lines reach the first touch electrodes to be connected thereto, and the second-region touch lines reach the second touch electrodes to be connected thereto. Alternatively, the first-region touch lines may extend vertically over the entire display region beyond the first touch electrodes to be connected thereto, and the second-region touch lines may extend vertically over the entire display region beyond the second touch electrodes to be connected thereto.

(5) In each of the foregoing embodiments, the specific plane shape of the liquid crystal panel (the array substrate) at the width increase section and width decrease section in the second region is not particularly limited, but may be appropriately changed.

(6) In each of the foregoing embodiments, the plane shape of the liquid crystal panel (the array substrate) in the first region is a quadrangular shape. Alternatively, the plane shape may be an odd shape (a shape other than a rectangular shape) in the first region. For example, when the plane shape of the liquid crystal panel (the array substrate) is a circular shape or an elliptical shape, the outline of the liquid crystal panel in the first region is partially curved, so that the liquid crystal panel has an odd plane shape as a whole.

(7) In addition to the embodiment (6), the plane shape of the liquid crystal panel (the array substrate) may be, for example, a semicircular shape, a semi-elliptical shape, a trapezoidal shape, a rhombic shape, a triangular shape, a pentagonal shape, or a polygonal shape more than a pentagonal shape.

(8) In each of the foregoing embodiments, the touch lines and the source lines are disposed on the same layer. Alternatively, the touch lines and the source lines may be disposed on different layers with an insulating film interposed therebetween. For example, the third metal film may be disposed above the second metal film constituting the source lines, with the interlayer insulating film interposed between the third metal film and the second metal film, and the touch lines may be constituted of the third metal film.

(9) In each of the foregoing embodiments, the touch lead lines and the touch lines are disposed on the same layer. Alternatively, the touch lead lines and the touch lines may be disposed on different layers with an insulating film interposed therebetween. For example, the touch lead lines may be constituted of the first metal film disposed below the second metal film constituting the touch lines, with the gate insulating film interposed between the first metal film and the second metal film. In such a case, the touch lines may be connected to the touch lead lines through contact holes formed in the gate insulating film.

(10) In each of the foregoing embodiments, the source lead lines and the source lines are disposed on the same layer. Alternatively, the source lead lines and the source lines may be disposed on different layers with an insulating film interposed therebetween. For example, the source lead lines may be constituted of the first metal film disposed below the second metal film constituting the source lines, with the gate insulating film interposed between the first metal film and the second metal film. In such a case, the source lines may be connected to the source lead lines through contact holes formed in the gate insulating film.

(11) In each of the foregoing embodiments, the gate circuit part receives a signal from the region where the flexible printed circuit is mounted in the array substrate. Alternatively, the gate circuit part may be configured to receive a signal from the driver.

(12) In each of the first to third, and sixth embodiments, one second region and one gate circuit part are provided. Alternatively, one second region and a pair of gate circuit parts may be provided.

(13) In each of the fourth and fifth embodiments, a pair of second regions and a pair of gate circuit parts are provided. Alternatively, a pair of second regions and one gate circuit part may be provided.

(14) The configuration described in the fifth embodiment may be applied to the configuration described in each of the first to third, and sixth embodiments.

(15) As a modification of the sixth embodiment, the curve axis of the liquid crystal panel may be located on a side closer to the array substrate in the Z-axis direction. In other words, the array substrate may be located closer to the curve axis than the CF substrate is, in the Z-axis direction.

(16) In each of the foregoing embodiments, the liquid crystal panel has an in-cell touch panel function. However, the liquid crystal panel does not necessarily have a touch panel function. In such a case, as described in, for example, the fifth embodiment, the first gate circuit lead lines, the through gate circuit connection line, and the second gate circuit lead lines are preferably provided for supplying signals to the gate circuit part.

(17) In each of the foregoing embodiments, the specific screen size of the liquid crystal panel is not particularly limited, but may be appropriately changed. In addition, the specific pitch of the pixel portions arranged in the liquid crystal panel is not particularly limited, but may be appropriately changed.

(18) In each of the foregoing embodiments, one driver is mounted on the array substrate. Alternatively, a plurality of drivers may be mounted on the array substrate.

(19) In each of the foregoing embodiments, the gate circuit part is disposed on the array substrate. Alternatively, the gate circuit part is not disposed, but a gate driver that is similar in function to the gate circuit part may be mounted on the array substrate.

(20) In each of the foregoing embodiments, an inspection circuit may be disposed on the array substrate in order to inspect lines for disconnection. The inspection circuit may be disposed on the region where the driver is mounted in the array substrate. Alternatively, the inspection circuit may be disposed near the display region so as not to be superimposed on the driver.

(21) In each of the foregoing embodiments, the drain electrodes of the TFTs and the pixel electrodes are formed on the gate insulating film; however, they may be stacked in any order. For example, the drain electrodes of the TFTs may be located above the pixel electrodes, or vice versa.

(22) In each of the foregoing embodiments, the light shielding portions are disposed on the CF substrate. Alternatively, the light shielding portions may be disposed on the array substrate.

(23) In each of the foregoing embodiments, the semiconductor film constituting the channel portions of the TFTs may be made of polysilicon. In such a case, preferably, each TFT is of a bottom gate type.

(24) In each of the foregoing embodiments, the touch panel pattern is of a self-capacitance type. Alternatively, the touch panel pattern may be of a mutual-capacitance type.

(25) In each of the foregoing embodiments, the liquid crystal panel is of a transmissive type. The technology described herein may also be applied to a liquid crystal panel of a reflective type and a liquid crystal panel of a transflective type.

(26) In each of the foregoing embodiments, the liquid crystal panel includes a pair of substrates and a liquid crystal layer sandwiched between the substrates. The technology described herein may be applied to a display panel including a pair of substrates, and a functional organic molecule other than a liquid crystal material, the functional organic molecule being sandwiched between the substrates.

The invention claimed is:

1. A display device comprising:
    signal supply circuitry that supplies a signal;
    a substrate including a first region and a second region that is on an edge of the first region and includes a width increase section having a width increasing as is farther away from the signal supply circuitry, the substrate further including a display region covering the first region and the second region and displaying an image;
    a display line disposed on the display region and through which a signal for display is transmitted;
    a line disposed on the first region and through which a signal is transmitted;
    signal receive circuitry disposed on the second region;
    a display lead line connected to the signal supply circuitry and an end of the display line close to the signal supply circuitry;
    a first lead line connected to the signal supply circuitry and an end of the line close to the signal supply circuitry;
    a second lead line connected to the signal receive circuitry and another end of the line opposite from the end of the line close to the signal supply circuitry;
    a position detection electrode on the display region and that defines a capacitance with a position input body that inputs a position and detect a position that is input with the position input body; and
    a second line on the second region and connected to the signal receive circuitry and including an end opposite from the signal supply circuitry being connected to the second lead line, wherein
    the signal receive circuitry is defined from the position detection electrode disposed on the second region.

2. The display device according to claim 1, further comprising:
    a first-region line disposed on the first region and connected to the position detection electrode and through which a signal is transmitted; and
    a first-region lead line connected to the signal supply circuitry and an end of the first-region line close to the signal supply circuitry.

3. The display device according to claim 2, further comprising
    a pixel electrode disposed on the display region and connected to the display line, wherein
    the first-region line and the line extend parallel to each other in the first region and have similar positional relationship relative to the display line and the pixel electrode.

4. The display device according to claim 1, wherein
    the second line includes second lines, the position detection electrode includes position detection electrodes disposed on the second region and each of the position detection electrodes is arranged to have a different distance from the signal supply circuitry, and a number of the second lines connected to the position detection electrode is increased as the distance between the signal supply circuitry and the position detection electrode is decreased.

5. The display device according to claim 1, further comprising:

a third line disposed on the second region and connected to the position detection electrode; and a third lead line connected to the signal supply circuitry and an end of the third line close to the signal supply circuitry.

6. The display device according to claim 5, wherein, the position detection electrode includes position detection electrodes disposed on the second region and each of the position detection electrodes is arranged to have a different distance from the signal supply circuitry, and the position detection electrode connected to the third line is closer to the signal supply circuitry than the position detection electrode connected to the second line is.

7. The display device according to claim 1, further comprising:

a second display line disposed on the display region and crossing the display line and through which a signal for display is transmitted; and display circuitry disposed on the second region outside the display region and that supplies a signal to the second display line, wherein the signal receive circuitry includes the display circuitry.

8. The display device according to claim 1, wherein the second region includes a width decrease section having a width that is decreased as is farther away from the signal supply circuitry.

9. The display device according to claim 1, wherein the second region includes a constant width section having a constant width irrespective of a distance from the signal supply circuitry.

10. The display device according to claim 1, further comprising:

pixel electrodes disposed on the display region of the substrate and connected to the display line;

a counter substrate disposed opposite the substrate with a clearance and including a plurality of color filters providing at least colors of blue, green, and red, the color filters being disposed to be respectively superimposed on the pixel electrodes and being arranged in a perpendicular direction perpendicular to a direction in which the line extends, wherein the substrate and the counter substrate each have a plate face curved around a curve axis extending along the perpendicular direction.

11. The display device according to claim 10, wherein the signal supply circuitry extends in the perpendicular direction.

12. The display device according to claim 1, wherein the line and the display line extend along each other and are included in a same layer.

13. The display device according to claim 1, wherein the line, the first lead line, and the second lead line are included in a same layer.

14. The display device according to claim 1, wherein the display line and the display lead line are included in a same layer.

* * * * *